United States Patent
Chakrabarti et al.

(10) Patent No.: US 6,389,436 B1
(45) Date of Patent: *May 14, 2002

(54) ENHANCED HYPERTEXT CATEGORIZATION USING HYPERLINKS

(75) Inventors: Soumen Chakrabarti, San Jose; Byron Edward Dom, Los Gatos; Piotr Indyk, Stanford, all of CA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/990,292

(22) Filed: Dec. 15, 1997

(51) Int. Cl.⁷ .............................................. G06F 15/00
(52) U.S. Cl. .............................. 707/513; 737/3; 737/4; 737/6
(58) Field of Search ................................ 707/513, 1–7; 706/20

(56) References Cited

U.S. PATENT DOCUMENTS

| | | | |
|---|---|---|---|
| 5,274,744 A | * 12/1993 | Yu et al. ........................ | 706/20 |
| 5,325,298 A | 6/1994 | Gallant .......................... | 707/5 |
| 5,414,781 A | * 5/1995 | Spitz et al. ................. | 382/296 |
| 5,418,948 A | * 5/1995 | Turtle ............................. | 707/4 |
| 5,463,773 A | * 10/1995 | Sakakibara et al. ......... | 707/102 |
| 5,488,725 A | * 1/1996 | Turtle et al. .................... | 707/5 |
| 5,594,897 A | * 1/1997 | Goffman ..................... | 707/102 |
| 5,617,488 A | * 4/1997 | Hong et al. ................. | 382/229 |
| 5,642,502 A | * 6/1997 | Driscoll .......................... | 707/5 |
| 5,675,710 A | * 10/1997 | Lewis ........................... | 706/2 |
| 5,675,819 A | * 10/1997 | Schuetze ....................... | 707/3 |
| 5,694,559 A | * 12/1997 | Hobson et al. ................ | 707/3 |
| 5,794,236 A | * 8/1998 | Mehrle .......................... | 707/5 |
| 5,832,470 A | * 11/1998 | Morita et al. .................. | 707/1 |
| 5,835,905 A | * 11/1998 | Pirolli et al. ................... | 707/3 |
| 5,873,056 A | * 2/1999 | Liddy et al. ................... | 707/3 |
| 5,873,107 A | * 2/1999 | Borovoy et al. ............ | 707/501 |
| 5,895,470 A | * 4/1999 | Pirolli et al. ................ | 707/102 |
| 5,930,788 A | * 7/1999 | Wical ............................. | 707/5 |
| 5,950,187 A | * 9/1999 | Tsuda ............................. | 707/3 |
| 6,026,399 A | * 2/2000 | Kohavi et al. ................. | 707/6 |

OTHER PUBLICATIONS

Lu et al., Stereo Image Matching Based on Probability Relaxation, TENCON '97, IEEE Region 10 Annual Conference, Dec. 1997, vol. 1, pp. 315–318.*

Kato et al., Multicast Markov Random Field Models for Parallel Image Classification, Computer Vision, May 1993, pp. 253–257.*

S. Li, et al., "Relaxation Labeling of Markov Random Fields," IEEE, pp. 488–492, 1994.

J. Savoy, An Extended Vector—Processing Scheme For Searching Information in Hypertext Systems, Information Processing & Management, vol. 32, No. 2, pp. 155–170, 1996.

(List continued on next page.)

Primary Examiner—Stephen S. Hong
Assistant Examiner—Cong-Lac Huynh
(74) Attorney, Agent, or Firm—Altera Law Group, LLC

(57) ABSTRACT

A method, apparatus, and article of manufacture for a computer implemented hypertext classifier. A new document containing citations to and from other documents is classified. Initially, documents within a neighborhood of the new document are identified. For each document and each class, an initial probability is determined that indicates the probability that the document fits a particular class. Next, iterative relaxation is performed to identify a class for each document using the initial probabilities. A class is selected into which the new document is to be classified based on the initial probabilities and identified classes.

51 Claims, 15 Drawing Sheets

OTHER PUBLICATIONS

J. Savoy, "Citation Schemes in Hypertext Information Retrieval," Information Retrieval And Hypertext, Ch. 5, pp. 99–120, 1996.

C. Apte, "Automated Learning of Decision Rules For Text Categorization," ACM Transactions on Information Systems, pp. 233–251, 1994.

D. Florescu, et al., "Using Probabilistic Information in Data Integration,"VLDB, p. 1, 1997.

R. A. Hummel, et al., "On The Foundations of Relaxation Labeling Processes," IEEE, vol. PAMI–5, No. 3, pp. 267–287, May 1983.

M. A. Hearst, et al., "Cat–a–Cone: An Interactive Interface For Specifying Searches And Viewing Retrieval Results Using A Large Category Hierarchy," Proceedings of $20^{th}$ Annual International ACM/SIGIR Conference, pp. 246–255, Jul. 1997.

* cited by examiner

ENHANCED HYPERTEXT CATEGORIZATION USING HYPERLINKS

BACKGROUND OF THE INVENTION

1. Field of the Invention

This invention relates in general to computer-implemented classifiers, and, in particular, to enhanced hypertext categorization using hyperlinks.

2. Description of Related Art

The Internet is a collection of computer networks that exchange information via Transmission Control Protocol/Internet Protocol ("TCP/IP"). The Internet consists of many internet networks, each of which is a single network that use the TCP/IP protocol suite. Currently, the use of the Internet for commercial and non-commercial uses is exploding. Via its networks, the Internet enables many users in different locations to access information stored in databases stored in different locations.

The World Wide Web (also known as "WWW" or the "Web") is a facility on the Internet that links documents. The Web is a hypertext information and communication system used on the Internet computer network with data communications operating according to a client/server model. Typically, Web clients will request data stored in databases from Web servers, which are connected to the databases. The Web servers will retrieve the data and transmit the data to the clients. With the fast growing popularity of the Internet and the Web, there is also a fast growing demand for Web access to databases.

The Web operates using the HyperText Transfer Protocol (HTTP) and the HyperText Markup Language (HTML). This protocol and language results in the communication and display of graphical information that incorporates hyperlinks (also called "links"). Hyperlinks are network addresses that are embedded in a word, phrase, icon or picture that are activated when the user selects a highlighted item displayed in the graphical information. HTTP is the protocol used by Web clients and Web servers to communicate between themselves using these hyperlinks. HTML is the language used by Web servers to create and connect together documents that contain these hyperlinks.

As the total amount of accessible information increases on the Web, the ability to locate specific items of information within the totality becomes increasingly more difficult. The format with which the accessible information is arranged affects the level of difficulty in locating specific items of information within the totality. For example, searching through vast amounts of information arranged in a free-form format can be substantially more difficult and time consuming than searching through information arranged in a pre-defined order, such as by topic, date, category, or the like. However, due to the nature of certain on-line systems, such as the internet, much of the accessible information is placed on-line in the form of free-format text.

Search schemes employed to locate specific items of information among the on-line information content, typically depend upon the presence or absence of key words (words included in the user-entered query) in the searchable text. Such search schemes identify those textual information items that include (or omit) the key words. However, in systems, such as the Web, where the total information content is relatively large and free-form, key word searching can be problematic, for example, resulting in the identification of numerous text items that contain (or omit) the selected key words, but which are not relevant to the actual subject matter to which the user intended to direct the search.

As text repositories grow in number and size and global connectivity improves, there is a pressing need to support efficient and effective information retrieval (IR), searching and filtering. Some conventional systems manage information complexity on the internet or in database structures typically using hierarchy structures. A hierarchy could be any directed acyclic graph, but, for purposes of simplifying the description, the present disclosure discusses hierarchies, primarily in the form of trees.

Many internet directories, such as Yahoo!™ (http://www.yahoo.com) are organized in preset hierarchies. International Business Machine Corporation has implemented a patent database (http://patent.womplex.ibm.com), that is organized by the PTO class codes, which form a preset hierarchy.

Taxonomies can provide a means for designing vastly enhanced searching, browsing and filtering systems. For example, they can be used to relieve the user from the burden of sifting specific information from the large and low-quality response of most popular search engines. Search querying with respect to a taxonomy can be more reliable than search schemes that depend only on presence or absence of specific key words in all of the searchable documents. By the same token, multicast systems such as PointCast (http://www.pointcast.com) are likely to achieve higher quality by registering a user profile in terms of classes in a taxonomy rather than key words.

Some conventional systems use text-based classifiers to classify documents. A text-based classifier classifies the documents based only on the text contained in the documents. However, documents on the Web typically contain hyperlinks. These hyperlinks are ignored by text-based classifiers, although the hyperlinks contain useful information for classification. Text classification without hyperlinks has been extensively studied. Some experiments show that classification techniques that are designed for, and perform well on, text often perform poorly on heterogeneous hyper-linked corpora such as the Web. Valuable information in the vicinity of a hyperlinked document is lost upon a purely-text-based classifier. Existing text classification research pays no heed to the vital information latent in such hyperlink structure.

So far, classifiers that use a statistical document model capture only the distribution of terms in documents. Information from other documents has been used in the form of term expansion: using associations over the entire corpus, terms in a document can be padded with strongly associated terms before running the document through a text-based classifier, as discussed in U.S. Pat. No. 5,325,298, for "Methods for Generating or Revising Context Vectors for a plurality of Word Stems", issued to S. Gallant, on Jun. 28, 1994, which is incorporated by reference herein.

Classification of entities from relational data is well-explored in the machine learning and data mining literature, which is discussed further in L. Brieman, J. H. Friedman, R. A. Olshen, and C. J. Stone, "Classification and Regression Trees", Wadsworth & Brooks/Cole, 1984; R. A. M. Mehta and J. Rissanen, "SLIQ: A Fast Scalable Classifier for Data Mining", Proc. of the Fifth International Conference on Extending Database Technology, Avignon, France, March 1996; M. M. J. C. Shafer, R. Agrawal, ""SPRINT" A Scalable Parallel Classifier for Data Mining", Proc. of the 22nd International Conference on very Large Databases, Bombay, India, September 1996; all of which are incorporated by reference herein. These typically work on a single relational table giving attributes of each entity (e.g., a customer).

Little appears to have been done about relationships between entities within the machine learning and data mining literature. In the case in which entities are patients, relationships could be useful in, say, diagnosing diseases. This is a very difficult problem in general. A few specific situations have been handled in the inductive logic programming literature, as discussed further in R. Quinlan, "Learning Logical Definitions from Relations, Machine Learning", 5, 3:239–266, 1990; S. Muggleton and C. Feng, "Efficient Induction of Logic Programs", Proc. of the Workshop on Algorithmic Learning Theory, Japanese Society for Artificial Intelligence, 1990; M. Pazzani, C. Brunk, and G. Silverstein, "A Knowledge-intensive Approach to Learning Relational Concepts", Machine Learning: Proc. of the Eighth International Workshop (ML91), Ithaca, N.Y., 1991; N. Lavrac and S. Dzeroski, "Inductive Logic Programming—Techniques and Applications", Chichester, 1994 [hereinafter "Lavrac and Dzeroski"]; all of which are incorporated by reference herein. However, these techniques have not yet been applied to large-scale data mining scenarios.

Another difference is the difference in dimensionality, discussed in S. Chakrabarti, B. Dom, R. Agrawal, and P. Raghavan, "Using Taxonomy, Discriminants, and Signatures for Navigating in Text Databases, VLDB, Athens, Greece, August 1997, [hereinafter "Chakrabarti, Dom, Agrawal, and Raghavan"]. Decision-tree classifiers handle up to hundreds of features or attributes, whereas text corpora often have a lexicon in the hundred thousands.

In other conventional systems, image processing and pattern recognition is used. Edge detection is an important operation in image analysis. The goal is to "classify" each pixel as part of some edge in the image, or an interior region. Thus, there are two classes. First, a spatial differentiation is applied, e.g., from each pixel, the average of its four neighbors is subtracted. This typically results in a noisy edge map. Continuity indicates that the class of a pixel depends on both its own brightness in the differentiated image, as well as the class of nearby pixels.

Hypertext classification is a generalization of this pattern recognition scenario. In particular, there may be many classes, including topic taxonomies, an average document has many more neighbors than pixels, and the neighbor's classes provide information in an indirect way (while pixels near edge pixels are more likely to be edge pixels, but patents citing patents on antennas can also be about transmitters). In pattern recognition, pixel classification is studied in a more general context of relaxation labeling and their convergence properties studied using Markov random fields, which is discussed further in R. A. Hummel and S. W. Zucker, "On the Foundations of Relaxation Labeling Processes", IEEE Transactions of Pattern Analysis and Machine Intelligence, PAMI-593):267–287, May 1983, [hereinafter "Hummel and Zucker"]; L. Pelkowitz, "A Continuous Relaxation Labeling Algorithm for Markov Random Fields", IEEE Transactions on Systems, Man and Cybernetics, 20(3):709–715, May 1990, [hereinafter "Pelkowitz"]; W. Dent and S. S. Iyengar, "A New Probabilistic Relaxation Scheme and Its Application to Edge Detection", IEEE Transactions of Pattern Analysis and Machine Intelligence, 18(4):432–437, April 1996, [hereinafter "Dent and Iyengar"]; all of which are incorporated by reference herein.

There is a need in the art for an improved classifier that can classify documents containing hyperlinks.

SUMMARY OF THE INVENTION

To overcome the limitations in the prior art described above, and to overcome other limitations that will become apparent upon reading and understanding the present specification, the present invention discloses a method, apparatus, and article of manufacture for a computer implemented hypertext classifier.

In accordance with the present invention, a new document containing citations to and from other documents is classified. Initially, documents within a neighborhood of the new document are identified. For each document and each class, an initial probability is determined that indicates the probability that the document fits a particular class. Next, iterative relaxation is performed to identify a class for each document using the initial probabilities. A class is selected into which the new document is to be classified based on the initial probabilities and identified classes.

An object of the invention is to provide a classifier for classifying documents that contain hyperlinks. Another object of the invention is to provide a classifier for classifying documents on the Web using any radius of influence.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

1. Hardware Environment

Figure 1:
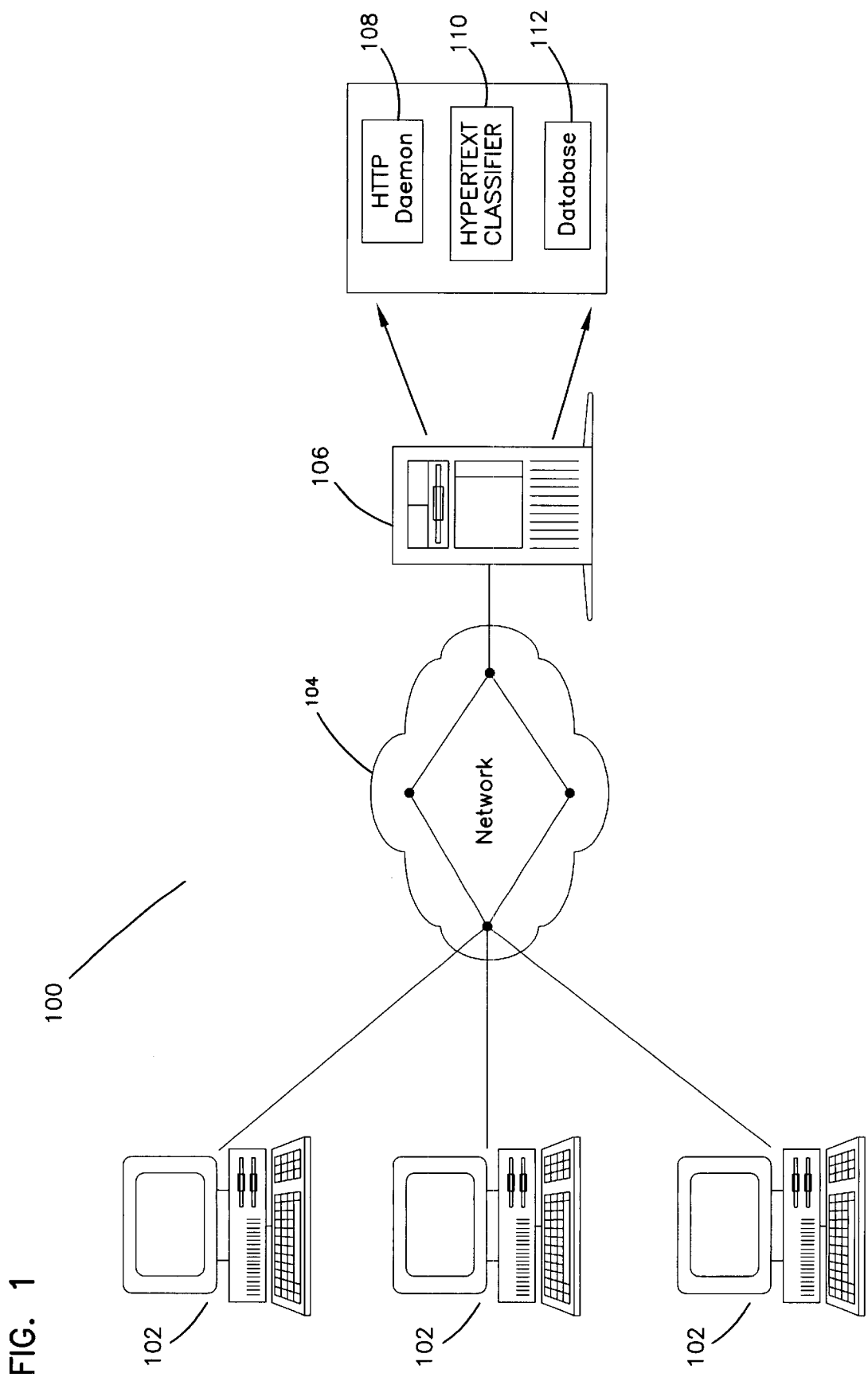
FIG. 1 is a block diagram of an exemplary hardware environment of the preferred embodiment of the present invention, and more particularly, illustrates a typical distributed computer system, wherein client computers are connected via a network to server computers.

FIG. 1 is a block diagram of an exemplary hardware environment of the preferred embodiment of the present invention, and more particularly, illustrates a typical distributed computer system 100, wherein client computers 102 are connected via a network 104 to server computers 106. A typical combination of resources may include clients 102 that are personal computers or workstations, and servers 106 that are personal computers, workstations, minicomputers, and/or mainframes. These network 104 preferably comprises the Internet, although it could also comprise intranets, LANs, WANs, SNA networks, etc.

Each of the computers, be they client 102 or server 106, generally include, inter alia, a processor, random access memory (RAM), data storage devices, data communications devices, monitor, user input devices, etc. Those skilled in the art will recognize that any combination of the above components, or any number of different components, peripherals, and other devices, may be used with the client 102 and server 106.

Each of the computers, be they client 102 or server 106, operate under the control of an operating system (OS), such as OS/390, AIX, UNIX, OS/2, Windows, etc. In turn, the operating system then controls the execution of one or more computer programs by the computer.

In the preferred embodiment of the present invention, the operating system of the client 102 controls the execution of a web browser and the operating system of the server 106 controls the execution of a web server 108. The web browser is typically a computer program such as IBM's Web Explorer, NetScape, Internet Explorer, Mosaic, etc. The web server 108 is typically a computer program such as IBM's HTTP Daemon™ or other World Wide Web (WWW) daemon.

The present invention is usually (although not necessarily) implemented by a computer program known as a hypertext classifier 110 and an associated database 112 (both of which may be permanently stored on a data storage device coupled to the server 106). The hypertext classifier 110 classifies documents that contain hyperlinks, and more specifically, it classifies documents on the Internet 104 using a radius-one or radius-two neighborhood. According to the present invention, a new document stored in the database 112 and containing citations to and from other documents is classified by the hypertext classifier 110. Initially, neighboring documents of the new document are identified. Then, for each document and each class, an initial probability is determined by the hypertext classifier 110, which indicates the probability that the document fits a particular class. Next, iterative relaxation is performed by the hypertext classifier 110 to identify a class for each neighboring document using the initial probabilities. A class is selected by the hypertext classifier 110 into which the new document is to be classified based on the initial probabilities and identified classes.

The hypertext classifier 110 and database 112 are both comprised of instructions and/or data which, when read, executed, and or interpreted by the server 106, causes the server 106 to perform the steps necessary to implement and/or use the present invention. Generally, the hypertext classifier 110 and database 112 are tangibly embodied in and/or readable from a device, carrier, or media, such as a memory, data storage device, and/or a remote device connected to the server 106 and accessible via a data communications method.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

2. Enhanced Hypertext Categorization Using Hyperlinks

When a new document is to be classified in a neighborhood, the hypertext classifier 110 processes the new document and all documents in a neighborhood around the document through a text-based classifier. Initially, the hypertext classifier 110 identifies the neighborhood of the new document to be classified. The neighborhood could be of any size, for example, even including all of the documents available on the Web. The neighborhood of documents, for a radius-one neighborhood, includes all documents to which hyperlinks (i.e., citations to and from other documents) in the new document point (i.e., out-links) and all documents containing hyperlinks that point to the new document (i.e., in-links); for a radius-two neighborhood, documents that in-link or out-link to documents that the new document in-links or out-links to are included; etc. For illustration purposes only, definitions for a radius-one neighborhood and a radius-two neighborhood were given, but one skilled in the art would recognize that the neighborhood could be larger.

Next, the hypertext classifier 110 invokes a text-based classifier. The text-based classifier assigns a probability vector to each document. The probability vector contains a component for each possible class into which the document can be classified. For example, for five classes, a probability vector would have five components, each component indicating the probability that the document would fall under the associated class. Once the initial probability vectors are identified, the text-based classifier estimates a new probability vector for the new document using the probability vectors of the other documents. Then, the text-based classifier selects the component of the estimated probability vector having the largest value. This component indicates that the new document is best classified in the classes associated with the component. In a conventional text-based system, the class would be selected using this component.

For example, assume that a document could be classified into one of the following classes: news, entertainment, sports, business, or theater. Then, if a document has an estimated probability vector of (0.2, 0.1, 0.15, 0.15, 0.4), then each component corresponds to each class as follows: 0.2-news, 0.1-entertainment, 0.15-sports, 0.15-business, and 0.4-theater. Then, the text-based classifier would select 0.4, the component with the largest value, and its corresponding class, theater, is the class into which the document is classified.

Unlike conventional systems, the hypertext classifier 110 of the present invention exploits topic information implicitly present in hyperlink structure. In particular, the hypertext classifier 110 performs iterative relaxation, which will be discussed in further detail below, for a selected "radius of influence" to identify a class for each neighboring document using the probability vectors assigned by the text-based classifier. The radius of influence can be of a different size from the "neighborhood" used by the text-based classifier. The hypertext classifier 110 then selects a class for the new document based on the determined probability vectors and the identified classes of neighboring documents.

Figure 2:
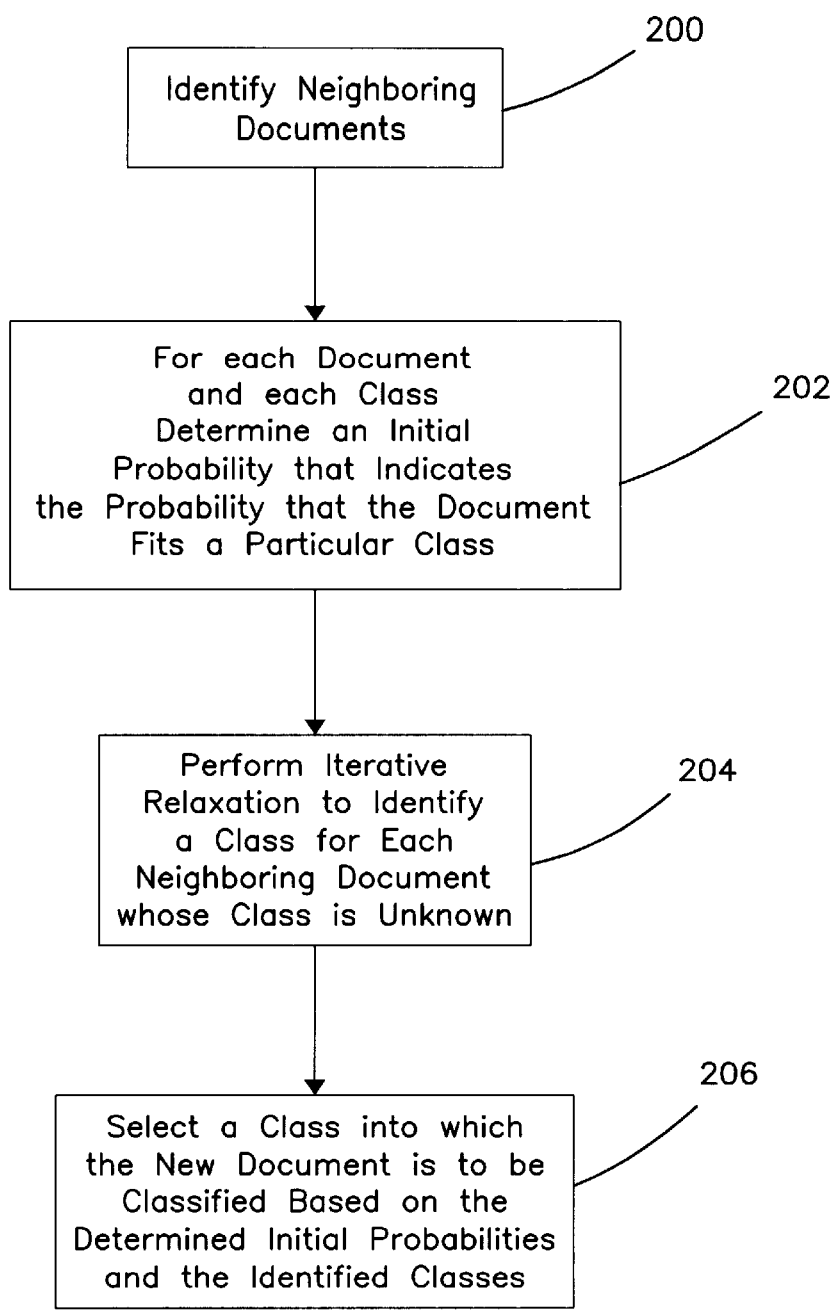
FIG. 2 is a flow diagram illustrating the steps performed by the hypertext classifier to classify a new document.

FIG. 2 is a flow diagram illustrating the steps performed by the hypertext classifier 110 to classify a new document. In Block 200, the hypertext classifier 110 identifies neighboring documents. In Block 202, the hypertext 110, for each document (i.e., the new document and the neighboring documents) and each class, determines an initial probability that indicates the probability that the document fits a particular class. In Block 204, the hypertext classifier 110 performs iterative relaxation to identify a class for each neighboring document whose class is not known. The hypertext classifier 110 uses the initial probabilities to identify these classes. In Block 206, the hypertext classifier 110 selects a class into which the new document is to be classified based on the determined initial probabilities and the identified classes.

3. Hypertext Classification Framework

Naive use of links, e.g., classifying a document based on its text (i.e., "local" text) as well as the text in neighboring documents (i.e., "non-local" text), can deteriorate accuracy, compared to using local text only. Informally, neighbor information is noisy in that it contains information that is unnecessary or irrelevant to classification. Therefore, the neighbor information needs to be "cleaned" before use. The hypertext classifier 110 extracts information from a neighborhood of radius-one to raduis-two around the target document, in a more robust manner. The hypertext classifier 110 draws from feature selection techniques and Markov random field theory from the signal processing 110 literature.

The examples that follow deal with two difficult corpora: a section of the Web sampled from Yahoo!™, and the U.S. Patent and Trademark Office ("PTO") database ("patent database"). Both have associated topic hierarchies. For patents, a classifier based on local terms alone achieves 66% accuracy; naive use of text in neighbors reduces this to 62%, whereas the hypertext classifier 110 improves accuracy to 80%. Results with Yahoo!™ are more dramatic: local classification is only 39% accurate; the hypertext classifier 110 improves this to over 75%. For the well-known Reuters newswire dataset, the hypertext classifier 110 was 87% accurate, which is comparable to the best numbers for that corpus.

Automatic identification of topics for unstructured documents is recognized as an important operation for text databases. This categorization can be used while populating a text database, such as during Web crawling. Documents collected in a text database can be indexed not only using keywords but also using these topics. This can significantly improve both ad-hoc search as well as for "push" services, where users can register profiles using these topics, as discussed in "Chakrabarti, Dom, Agrawal, and Raghavan" and C. Checkuri, M. Goldwasser, P. Raghavan, and E. Ufal, "Web Search Using Automatic Classification", 6th World Wide Web Conference, 1996. Taxonomy-oriented systems for interacting with text collections greatly improves the searching and browsing experience, discussed further in M. Hearst and C. Karadi "Cat-a-Cone: an Interactive Interface for Specifying Searches and Viewing Retrieval Results Using a Large Category Hierarchy," Proc. of ACM SIGIR 97, pp. 246–255, ACM Press, 1997; D. Florescu, D. Koller, and A. Levy, "Using Probabilistic Information in Data Integration", VLDB, Athens, Greece, 1997; each of which is incorporated by reference herein.

Topic identification is one example of extracting structured information from a semi-structured or unstructured source. This is becoming increasingly important as hypertext is becoming a standard datatype supported by most modern databases or database extenders, such as IBM's Universal Database, Oracle's ConText, Verity, etc. Most of these provide support for unsupervised and supervised categorization. The former is clustering; the latter is classification. An automatic classifier is first provided a topic set (i.e., classes), which may be flat or hierarchical, with sample documents for each topic. Using these, the classifier "learns" the topics, in that the classifier is able to classify documents under particular topics. Later, upon receiving new documents, the classifier finds the best matching topics.

Automatic document classification has been extensively researched in IR, discussed further in C. Apte, F. Damerau, and S. M. Weiss, "Automated Learning of Decision Rules for Text Categorization", ACM Transactions on Information Systems, 1994, [hereinafter "Apte, Damerau, and Weiss"], which is incorporated by reference herein. Until recently, text-based classifiers were tested over flat topic sets, as discussed in "Chakrabarti, Dom, Agrawal, and Raghavan" and D. Koller and M. Sahami, "Hierarchically Classifying Documents Using very Few Words", International Conference on Machine Learning, Vol. 14, Morgan-Kaufmann, July 1997, [hereinafter "Koller and Saharni"], which is incorporated by reference herein. With deeper taxonomies, careful feature selection becomes important; otherwise, common jargon words in a subtopic, which are not usual stop words, confuses the classifier. That is, the terms that best separate /Yahoo/Arts from /Yahoo/Science may be poor discriminants deeper into the Arts subtree.

In spite of these advances in feature selection, even the recent literature has been restricted to corpora containing homogeneous documents, e.g., a set of news articles (e.g., Reuters at http://www.research.att.com/lewis) or a set of medical documents (e.g., MEDLINE at http://medir.ohsu.edu/pub/ohsumed). The vocabulary is coherent and the quality of authorship is high. For the Reuters dataset, classifiers based on rule induction or feature selection classify 80 to 87% of the documents correctly, as illustrated in "Chakrabarti, Dom, Agrawal, and Raghavan", "Apte, Damerau, and Weiss", and Y. Singer and W. W. Cohen, "Context-sensitive Learning Methods for Text Categorization", SIGIR, ACM, 1996, which is incorporated by reference herein.

Unfortunately, these results did not carry over to two hyperlinked corpora: the Web and the patent database. The same classifier that was 87% accurate for Reuters, tested on a two-level taxonomy tree derived from the patent database, correctly classified only 66%, discussed in "Apte, Damerau, and Weiss". On a sample from the 14 top-level topics of Yahoo!™ (as of July 1996) the performance was even poorer: only 39% of the documents were classified correctly.

This is comparable to a recent study by Sahami on a similar sample from Yahoo!™ using a more sophisticated classifier that used Bayesian nets, discussed in "Koller and Sahami" and M. Sahami, "Web Classification Using Bayesian Nets, Personal Communication", October 1997, [hereinafter "Sahami"], which is incorporated by reference herein.

It appears that classification based on terms alone is not adequate for most hypertext. Web documents are extremely diverse: home pages, topical resource lists, hierarchical HTML documents generated automatically from conventional programs, active pages with scripts and links, etc. Even within a broad area there is little consistency in vocabulary. Many Web documents are very short, serving merely as a list of resource links. The issue of classification based on non-local features (i.e., attributes of documents linked to the document being classified) also looms large in other hyperlinked corpora, such as the patent database, academic publications, and citation graphs.

The hypertext classifier 110 of the present invention takes advantage of information latent in hyperlinks that can be exposed to a suitably designed classifier, so that the judgment of topic is based on information that is both local and non-local to the document to be classified. The end result is a hypertext classifier 110 that achieves significantly improved accuracy at a computational expense that is only slightly higher than the fastest classifiers that look only at local text in a document. The hypertext classifier 110 uses a general statistical hypertext graph model to infer the topic of documents based on its hyperlink neighborhood.

Hyperlinks can be found in homogeneous or heterogeneous corpora. In the domain of academic papers, all papers are semantically similar objects. All citations thus have the same format, from one paper to another. The same is true for patents. In contrast, at least two kinds of hyperlinks are seen on the Web. The first type is navigational hyperlinks, which are intra-site and assist better browsing of the site. The second type reflects endorsement hyperlinks, which are typically across sites. Endorsement links are often associated with pages that are called "resource pages" or "hubs" on the Web, discussed in J. M. Kleinberg, "Authoritative Sources in a Hyperlinked Environment", to appear in Symposium of Discrete Algorithms, San Francisco, 1998. These resource pages point to many pages of similar topics and give important information for automatic classification.

Links can be exploited in a number of ways, including by absorbing the text of a document's neighbors (i.e., documents that are cited by or that cite the document) into the document as if they were local terms. Experiments were performed with the pre-classified patent database and the Yahoo!™ Web directory. However, absorbing neighbor text does worse than classification based on local terms alone. This seems to be due to the fact that the outward links from many Web pages point to Web pages from a diverse set of topics. For example, Web pages of almost every topic point to Netscape. Similarly, there is significant linkage between related topics among patents, e.g., patents on Regulator and System refer frequently to those on Transmission and patents on Modulator cite those on Oscillator, etc. Sometimes scenarios on the Web indicate links to unrelated topics.

This technique of absorbing text makes it clear that the topics of neighboring documents, and not necessarily their terms, determine linking behavior. Therefore, rather than directly use terms from the neighborhood, the hypertext classifier 110 develops a more elaborate model of hypertext in which the class of a document determines the text in it as well as its propensity to link to documents from a set of related classes.

In the case in which the classes of all neighbors of the test document (i.e., the document which is being classified) are known, classification is simpler and more accurate than text-based classifiers. The more likely situation is that only a fraction of the documents in the test document's neighborhood is pre-classified. To classify the unclassified neighbors, literature in Markov Random Field Theory provides a technique that initially guess the classes based on text alone, and then updates the guesses iteratively to produce a better estimation of class, as discussed further in "Hummel and Zucker", "Pelkowitz", and "Dent and Iyengar". The class assignment is guaranteed to converge if initiated sufficiently close to a "consistent" configuration.

Small neighborhoods, such as of radius 1–2 links around the test document, appear adequate for significant improvements beyond text-based classifiers. For a corpus of patents, which are already authored consistently, the hypertext classifier 110 cuts down classification error from 36% to 21%, a reduction of 42%. The effects on Web documents sampled form Yahoo!™ are more drastic: text-based classification errs about 65% of the time, whereas, the hypertext classifier 110 has only 25% error, a reduction of 62%. Considering that there are over 5 million patents and 50 million Web pages, this is a significant step forward in accuracy and robustness. The hypertext classifier 110 also shows a graceful variation of accuracy as the fraction of documents whose classes are pre-specified changes. The hypertext classifier 110 enhances accuracy even when none of the documents in the neighborhood have a pre-specified class.

4. Hypertext Classification Basics

The hypertext classifier 110 addresses the integration of text and hyperlinks into a unified model that is then efficiently used by a statistical classifier.

In traditional text classification, the object being classified is a self-contained document. A document is a sequence of terms. During training, documents are supplied to the classifier with attached pre-assigned classes. The classifier develops models for the classes in some form or other. During testing, the classifier assigns classes to previously unseen documents.

This section contains two parts. The first part reviews pure text-based classification, including a discussion of the basic classification technique, the statistics that are collected, and how these are used to infer topics for new documents. In the second part, the essential complication that hypertext brings into the pure text-based classifier is discussed along with the hypertext classifier 110. A hypertext document is not a self-contained document. Instead, a hypertext document has in-neighbors (i.e., documents that point to it) and out-neighbors (i.e., documents to which it points). These in-neighbors and out-neighbors, and, in turn, their neighbors, form a hypertext graph, which could have cycles. For both training and testing, this hypertext graph is the view that the classifier has of the corpus.

4.1 Text-Based Classification

Conceptually, as the training text is being scanned, the text-based classifier's database is organized as a three-dimensional table. One axis is for terms, with the string forms of the terms being replaced by 32-bit identifiers called TIDs. The TIDs are denoted t in the equations below. The word "terms" in the following discussion may refer to class names, class identifiers, specially tagged terms, or any token in general. The second axis is for documents, which are denoted d in the equations. The third axis is for classes or topics. Topics have a hierarchy defined on them, and for illustration only, a tree hierarchy will be assumed. These classes are also assigned identifiers and called CIDs, which are denoted c in the equations.

In general, beyond elementary case-conversion, stop word filtering, and stemming, the text-based classifier performs no linguistic operations, letting only the feature statistics drive the technique. This makes the system more efficient and robust.

The measure maintained along these dimensions (t, d, c) is called n(t, d, c), which is the number of times t occurs in d $\in$c. This number is non-zero only when t $\in$d $\in$c. t $\in$d means that the term t occurs in document d, and d $\in$c means that d is a sample document in the training set for class c. A superclass of c, i.e., an ancestor in the topic tree, inherits all d $\in$c.

Aggregations along the dimensions give some important statistics about the corpus which is used by the text-based classifier:

The length of document d is given by n(d,c)=$\Sigma_t$n(t,d,c). The length of all documents can be found using a GROUPBY operation on (d,c).

The total length of training documents in class c, denoted n(c).

The total number of times term t appeared in training documents of class c.

The fraction of times term t occurs in d $\in$c, i.e., f(t,d,c)= n(t,d,c)/$\Sigma_t$n(t,d,c). Additionally, the sum of $f$ and $f^2$ over documents in a class is used.

The number of training documents in class c that have at least one occurrence of a specific term t. This is denoted m(t,c).

The number of training documents in class c, denoted |c|.

Figure 3:
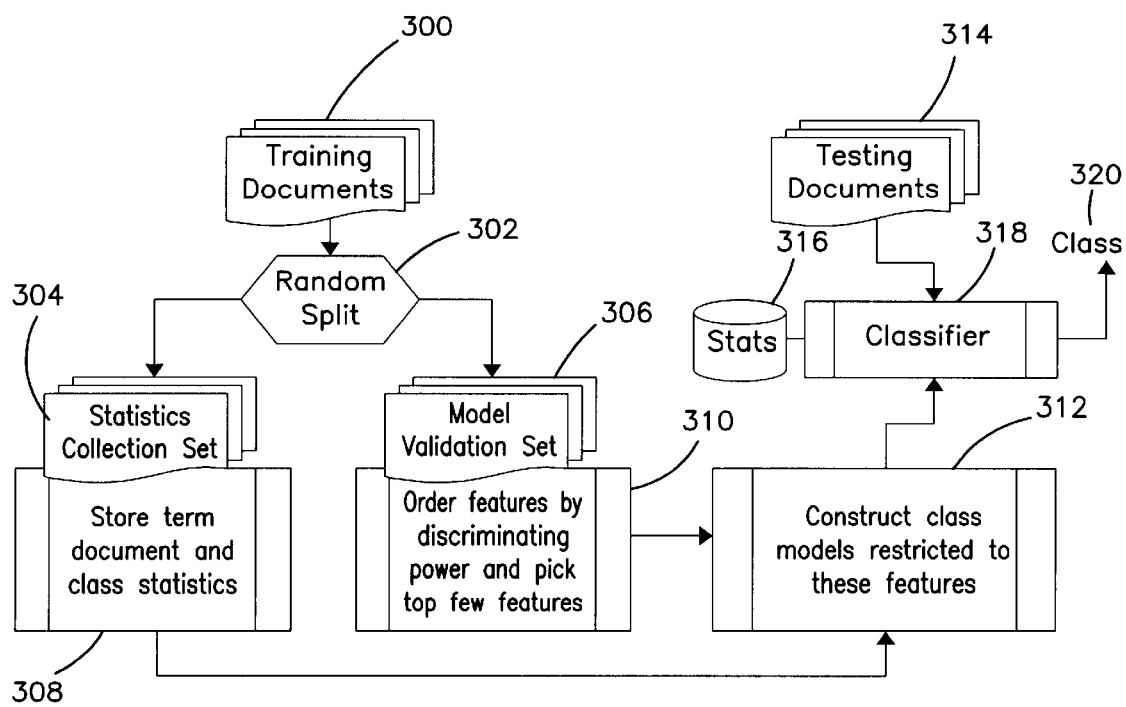
FIG. 3 is a block diagram illustrating a sample automatic classification system that could be used with the present invention.

Since these are the only statistics that are relevant, and all of these are combinable aggregates, they can be collected efficiently. A single pass is made over the corpus, maintaining in-memory hash tables that are output to disk when memory is fill. These hash tables are then merged FIG. 3 is a block diagram illustrating a sample automatic classification system that could be used with the present invention. In particular, training documents 300 are randomly split, in Block 302, into a statistics collection set 304 and a model validation set 306. For the statistics collection set 304, in Block 308, the term, document, and class statistics are stored. For the model validation set 306, in Block 310, features are ordered by discriminating power and a few features are selected. The output of Blocks 308 and 310 is input to Block 312 where class models, which are restricted to the selected features, are constructed. The classifier 318 receives testing documents 314, statistics 316, and the output of Block 312. Using this information, the classifier 318 identifies a class 320 for each testing document.

After the three-dimensional table is constructed, feature selection is performed. Some terms are good discriminators between the classes because they occur significantly more frequently in a few classes than in the others. These are "signal" terms, and the other terms are "noise", which should be discarded before the classifier forms document models for the classes. This has to be done at each internal node of the topic taxonomy since terms that best help separate documents at one node in the taxonomy may be of little use elsewhere.

Finding the best set of signal terms depends on the classifier used, which in turn depends on the statistical model one assumes the data is drawn from. Many proposed conventional models related to Poisson and multinomial processes exist in the literature. Unfortunately, for most such models, finding exactly the optimal set of terms out of a lexicon of 50,000–100,000 terms appears impractical. In the present invention, rather than search for arbitrary subsets, first, the terms are ordered in decreasing ability to separate the classes. One notion of such ability computes a score, which can be derived from the Signal Processing literature, further described in R. Duda and P. Hart, "Pattern Classification and Scene Analysis", Wiley, N.Y., 1973, [hereinafter "Duda and Hart"], which is incorporated by reference herein. The following Equations (1) and (2) illustrate one technique for determining the score, but one skilled in the art would recognize that other techniques could be used to compute the score.

$$\text{score}(t) = \frac{\sum_{c1c2}(\mu(c_1, t) - \mu(c_2, t))^2}{\sum_c \frac{1}{|c|} \sum_{d \in c}(f(t, d, c) - \mu(c, t))^2},$$

$$\text{where } \mu(c, t) = \frac{1}{|c|} \sum_{d \in c} f(t, d, c).$$

After the three-dimensional table of statistics is computed, the above score is calculated for all terms. Next, the terms are ordered by decreasing score, and a set F of terms is selected that is a prefix of the above sequence and that gives the best classification accuracy over a random text set. F is called the feature set. It is important to have an efficient technique that makes a single pass over the training corpus in performing all of these steps.

After feature selection, a classifier has to be associated with each internal node $c_0$ of the topic taxonomy. Suppose $c_0$ has children $c_1, \ldots, c_1$. Given a model for each class, the classifier at $c_0$ estimates model parameters for each child. When a new document is input, the text-based classifier evaluates, using the class models and Bayes law, the posteriori probability of the document being generated from each child $c \in \{c_1, \ldots, c_1\}$ in turn, given it was generated from $c_0$. Simple document models are used. In the Bernoulli model, every class has an associated coin with as many sides as there are terms in the lexicon. Each face of the coin has some success probability. A document in the class is generated by repeatedly flipping the coin and writing down the term corresponding to the face that turns up. Assuming this model is used, the following Equation (3) is applicable:

$$Pr[d \in c \mid c_0, F] = \frac{\pi(c) \prod_{t \in d \cap F} \theta(c, t)^{n(d,t)}}{\sum_{c'} \pi(c') \prod_{t \in d \cap F} \theta(c', t)^{n(d,t)}},$$

Where $\theta(c_1 t)$ is an estimated model parameter corresponding to the probability that "face" t turns up when "coin" c is tossed. x(c) is the prior probability of class c, typically, the fraction of documents in the training or testing set that are from class c. The details of feature selection and estimation of $\theta$ have been described in "Chakrabarti, Dom, Agrawal, and Raghavan". An alternative binary model truncates $n(d_1 t)$, the number of times term t occurs in document $d_1$ to a $\{0,1\}$ value, as discussed in "Koller and Sahami". The estimation of $\theta$ changes slightly, but much of the above framework remains unchanged.

Figure 4:
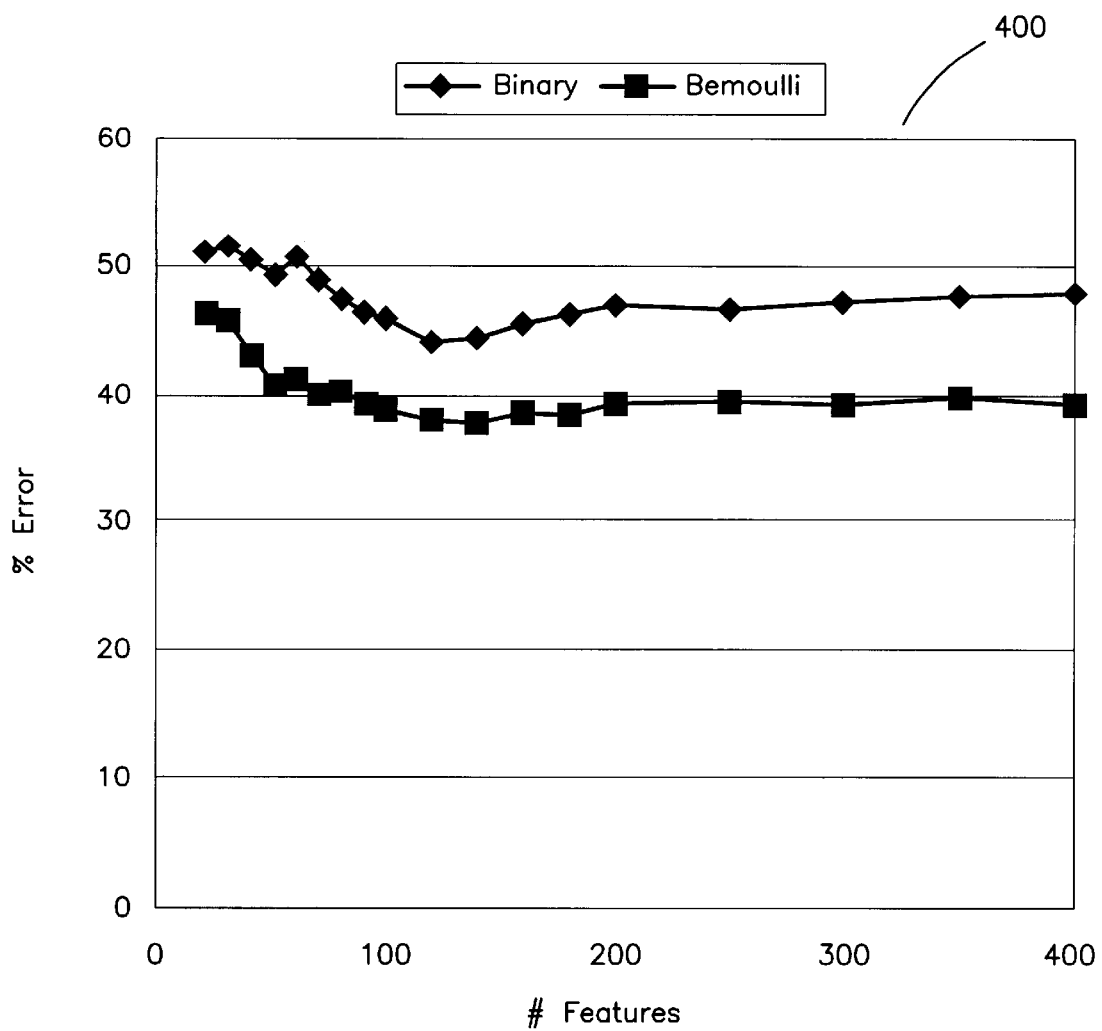
FIG. 4 is a graph that illustrates a comparison of classification error rate against the size of the feature set |F|, for binary and Bernoulli models for a node in the patent topic tree.

FIG. 4 is a graph 400 that illustrates a comparison of classification error rate against the size of the feature set |F|, for binary and Bernoulli models for a node in the patent topic tree. Similar results are seen for Reuters newswire and Web documents. Therefore, the text-based classifier uses the Bernoulli model. The text-based classifier constructs the above graph in one pass over the part of the training corpus set aside for model validation. The curve plots error rate against the size of F, the chosen feature set. The curve typically decreases as useful features are brought into F, and then increases as F starts to include noise. F should be set at the minimum error point. The Bernoulli model performed better than the binary model, and the Bernoulli model had a lower error rate and less sensitivity to picking too many features.

4.2 The Complications of Hypertext
4.2.1 A General Model

Assume that the corpus is a directed graph. Each node in the directed graph is a document, which, in turn, is a sequence of terms. Terms can be considered to be atomic tokens. The edges of the directed graph are hyperlinks. In a more detailed model in which hyperlinks are embedded into running text, such as HREF's in HTML, the term sequence is generalized to include these out-links.

A corpus is a set of documents (also called nodes) $\Delta=\{\delta_i, i=1,2,\ldots,n\}$ and these are linked by directed links $i \rightarrow j$. Let $G(\Delta)$ be the graph defined by these documents and links, and let $A=A(G)$ be the associated adjacency matrix: $A=\{a_{ij}\}$, (or the equivalent set, depending on the context), where $a_{ij}=1$ if the link $i \rightarrow j$ exists and $a_{ij}=0$ if it doesn't. Let $\tau_i$ represent the text of document i and let $T=\{\tau_i\}$ represent the entire collection of text corresponding to $\Delta$. Each $\tau_i$ is a sequence $\{\tau_{ij}|j=1,\ldots,n_i\}$ of tokens consisting of terms, formatting controls, and citations (e.g., hyperlinks). $\tau$ is used as a multiset, rather than a sequence. Also, terms and citations will be treated separately, and for the following illustration, formatting controls will be ignored.

The input to the hypertext classifier 110 is not merely a set of documents, but also includes a directed graph and an assignment from nodes to classes. When the hypertext classifier 110 has to label a new document, the hypertext classifier 110 has as input not only that document, but also some neighborhood of that node in the graph, and is free to make use of any information in this neighborhood, perhaps the whole corpus.

The documents $\Delta$ are to be classified into a set of classes or categories $\Gamma=\{\gamma_i, i=1,2,\ldots,m\}$, $c_i$ is the class assignment of document i, and $C=\{c_i\}$. Assuming that there is a probability distribution for such collections, C is selected such that P(C|G, T) is maximum. This constitutes a Bayes classifier, which gives the minimum expected error rate over all classifiers, discussed further in "Duda and Hart". Pr(C|G, T) is decomposed using Bayes rule in the following Equations (4) and (5), as follows:

$$Pr(C \mid G, T) = \frac{Pr(C, G, T)}{P(G, T)} = \frac{Pr(G, T \mid C) Pr(C)}{Pr(G, T)}$$

where $$Pr(G, T) = \sum_{C'} [Pr(G, T \mid C') Pr(C')].$$

Because Pr(G, T) is not a finction of C, it will suffice to choose C to maximize Pr(G,T|C)Pr(C). In some cases the categories of some of the documents will be known. When categories of some documents are known, C is divided into two disjoint sets: $C_K$ (the known classes) and $C_U$ (the unknown classes). With these terms, the classification problem is that of selecting $C_U$ to maximize $Pr(C_U|C_K,G,T)$. In many cases (e.g. where the document collection is the entire Web), only a subset of the classes in $C_U$ are relevant to the categorization.

In order to perform the estimation of $C_U$, a form for Pr(C,G,T) is needed. It is unlikely that a known function is available for Pr(C,G,T), and so the form is estimated. In order to do that, an initial functional form is used that has parameters that are estimated. Even so-called "non-parametric" forms have this property. In reality, of course, it is impractical to attempt to estimate a form for $Pr(C_U|C_K, G,T)$ where $\{C_K,G,T\}$ appears as a simple list of all the associated values (e.g., links and terms). A big part of the challenge in finding such a form is to find a set of "features" that extract in a condensed manner the information most useful for performing categorization. In addition to the definition and selection of features, the computation and estimation associated with $Pr(C_U|C_K,G,T)$ can be simplified by making certain independence assumptions. These are frequently not correct, but making the independence assumptions can be seen to constitute a kind of approximation. Ultimately, of course, the validity of the independence assumptions will be judged by the accuracy of the associated classification obtained.

All the information contained in $C_K$, G, and T is potentially useful in classifying a single document $\delta_i$. Making use of all this information, however, is computationally expensive. Intuitively, the relevance of various aspects (i.e., classes, links, and terms) falls off rapidly with distance, in links, from $\delta_i$.

Consider hypertext document $\delta_i$. The most general equation proposes to transform $\delta_i$ into a super-document $\delta_i'$ that includes not only the terms in $\delta_i$ but all terms in the hypertext graph, in a specially tagged fashion (otherwise all documents would be identical). Thus, cat in $\delta_i$ remains cat in $\delta_i'$. If $\delta_i$ points to $\delta_j$, which has term cat in it, the special term 0@cat is added to $\delta_i'$. The "0" signifies an outlink. Similarly, the term cat appearing in a page pointing to $\delta_i$ is added to $\delta_i'$ as I@cat. If $\delta_j$ points to $\delta_i$ and $\delta_k$, where $\delta_k$ contains term cat, the special term I0@cat appears in $\delta_i$. Prefixes like 0I0@ are tags to separate the original terms from these engineered features.

In qualitative terms, it is conceivable that a classifier loses no necessary information when presented with $\delta_i'$, which is now gigantic, rather than with $\delta_i$ and its associated corpus graph. Then, a feature selection process can automatically decide the importance of all these features and throw out the noise. However, this general scheme is unlikely to be feasible for at least two reasons. First, each document grows to a large document in the new space, potentially absorbing a large number of terms. Second, the number of possible tags is enormous, and there will not be enough data to learn this space. Also, most tagged terms may be very rare.

Given an adequate training data, and the time to make use of it, the worst that the inclusion of these additional terms can do is to have no effect on classification accuracy, but it is expected to result in some improvement. Intuitively, it is expected that terms in nearby neighbors will be used by the classifier, whereas terms that are far away will be discarded as noise. In practical situations, this is not necessarily the case. This can be seen as a signal-to-noise issue, and there are so many irrelevant terms that fitting-the-noise effects are inevitable with realistic training corpus sizes.

4.2.2 Feature Engineering

The hypertext classifier 110, in performing feature engineering, transforms the hypertext graph so that the documents to be classified can be dealt with using a possibly different feature set that better exposes structure for a classifier to learn.

It is clear that it will be impractical and not very useful to use all the text in T (i.e., the whole corpus) to classify a single document. At the other extreme, most text-classification systems use only the text $\tau_i$ contained in the document $\delta_i$. In corpa that is not hyperlinked, this is all that is available to use in performing the classification. It may be useful to use more that just the text $\tau_i$ to classify $\delta_i$, however, and therefore, it is preferable to find some "happy medium" between these two extremes.

A similar problem appears in inductive logic programming, as discussed in "Lavrac and Dzeroski". Suppose a relational table, or several tables, are given containing information about patients with hypertension. Apart from local attributes of a person, such as age and weight, there can be other attributes, such as father and mother, whose records are also in the database. Assuming there is a relation between lineage and hypertension, the latter fields are used for inducing rules to classify patients as having high or low risk of heart attack. To do this, each record is augmented with fields from records of the parents. Rather than using raw data from the related records, the raw attribute values can be pre-processed into a synthesized feature. One example is whether the parent was classified as high or low risk. This is called feature engineering.

Starting with the general model, the following Sections 5 and 6 provide simplified models for hyperlinked documents. In the first, the concern is with immediate neighborhoods, for both in-links and out-links. In the second, the concern is to extend to a radius-two neighborhood. On a graph with sufficient average degree (the Web today is estimated to have an average degree of 10–15), the radius-one neighborhood is already quite large, and processing text in the radius-two neighborhood is almost out of the question. However, the hypertext classifier 110 keeps the computation within practical limits and yet exploits hyperlink information.

4.2.3 Datasets for Evaluation

Figure 5A:
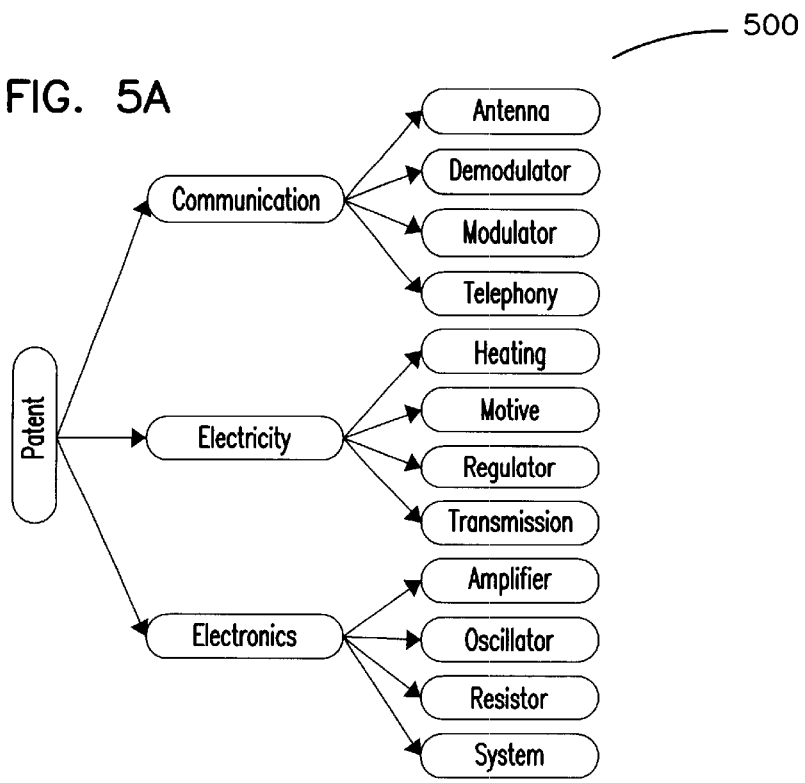
FIGS. 5A and 5B illustrate topic hierarchies for two manually pre-classified hyperlinked corpora used as datasets.
Figure 5B:
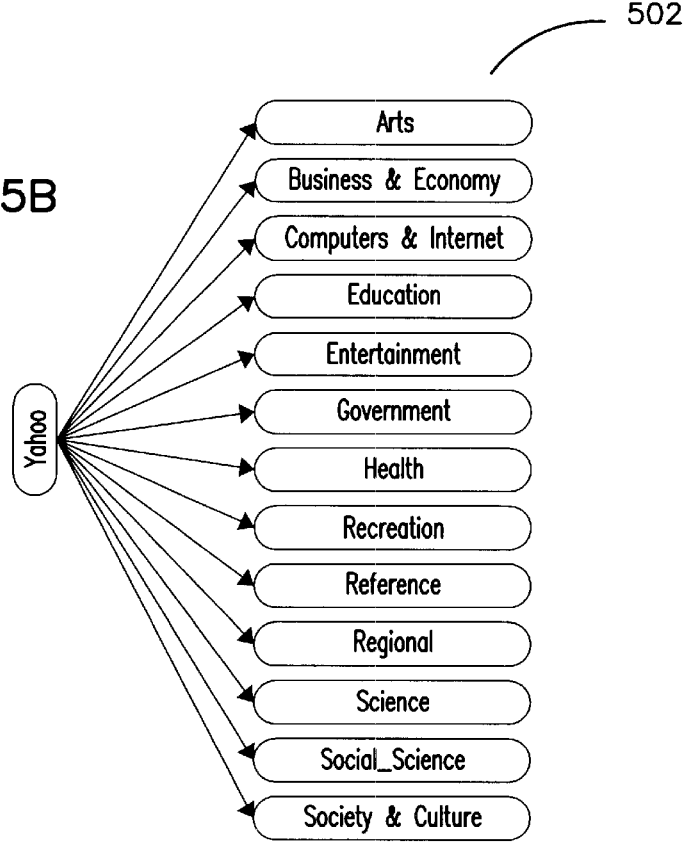

FIGS. 5A and 5B illustrate topic hierarchies 500, 502 for two manually pre-classified hyperlinked corpora used as datasets. The first corpus is the IBM Patent Server database stored in DB2. The schema permits efficient queries on pre-assigned classes and link structure. The text is stored as a binary large object ("BLOB"), which is tokenized with a text-classifier, using an embedded SQL C++ application. The topic hierarchy 500 for the IBM Patent Server database has three first level nodes and 12 leaves. These topics pose a difficult topic problem in that there is a large vocabulary overlap and cross-linkage between the topics. For each leaf, 630 randomly selected documents were chosen for training and 300 for testing. The second corpus is a sample of about 20,000 documents taken from Yahoo!™. The topic hierarchy 502 for Yahoo!™ has two levels, with the top level of Yahoo!™ having 13 classes. For later experiments based only on hyperlinks, a subset of 900 documents were used. In both cases, classes were manually assigned to each document, and it is assumed that the class is designated as correct based on the measure of the fraction of test cases in which the hypertext classifier 110 agrees with the prescribed class.

5. The Radius-One Specialization

The hypertext classifier 110 is able to classify a document for any radius of influence, but, for illustration only, the following discussion will describe a radius of influence of one (i.e., a radius-one specialization). During training, each sample document has a pre-assigned class, and the hypertext classifier 110 is permitted to explore any neighborhood of the sample and to know the assigned classes of documents in the neighborhood, but the test document's class is not available. Furthermore, the fraction of documents is controlled and varied in the neighborhood whose pre-assigned classes are "exposed" to the hypertext classifier 110. The exposed documents are chosen uniformly at random from the neighborhood that the hypertext classifier 110 chooses to explore to classify the test document.

During testing, the hypertext classifier 110 initially grows a neighborhood graph around a test document. Then, the hypertext classifier 110 uses features directly, or derived from, the neighborhood to classify the test document. In the case in which all immediate neighbors of the test document are exposed (i.e., the classes of the neighboring documents are known), the classification is completed by using these classes and the probabilities generated using a text-based classifier to determine the class of the test document. In the case in which only a fraction of the neighborhood is exposed (i.e., the classes of some or all neighboring documents are unknown), additional work is done to identify the classes of these neighboring documents, as will be discussed below.

The hypertext classifier 110 bootstraps off a text-based classifier, and then iteratively updates the classes of documents in the neighborhood until stability is reached. This update is done by a hypertext classifier 110 that combines local and non-local features to within a radius of one or two. A typical academic paper, a patent in the patent database, and an average Web page all have typically more than ten citations (i.e., out-links). Thus, a radius-one neighborhood already has the potential to slow down a classifier by a significant factor, however, the hypertext classifier 110 avoids this problem. The radius of the initial neighborhood is unrelated to, and can be larger than, the "radius of influence."

Various experiments implement a "radius of influence" of one using the following alternatives, each of which has been tested on a patent database:

Local: For both training and testing, a pure text-based classifier could be used on the text of each patent itself. Thus, no use is made of hyperlinks. This provides a baseline.

Local+Nbr: For both training and testing, the complete text of all of the documents neighbors (e.g., patents the document cites and patents that cite to the document) is first concatenated with the text of each patent. The result is input to a pure text-based classifier.

Local+TagNbr: This is similar to Local+Nbr, but the terms absorbed from neighbors are distinguished from original local terms by tags, so that the classifier can distinguish between the signal content of local versus non-local terms.

Figure 6B:
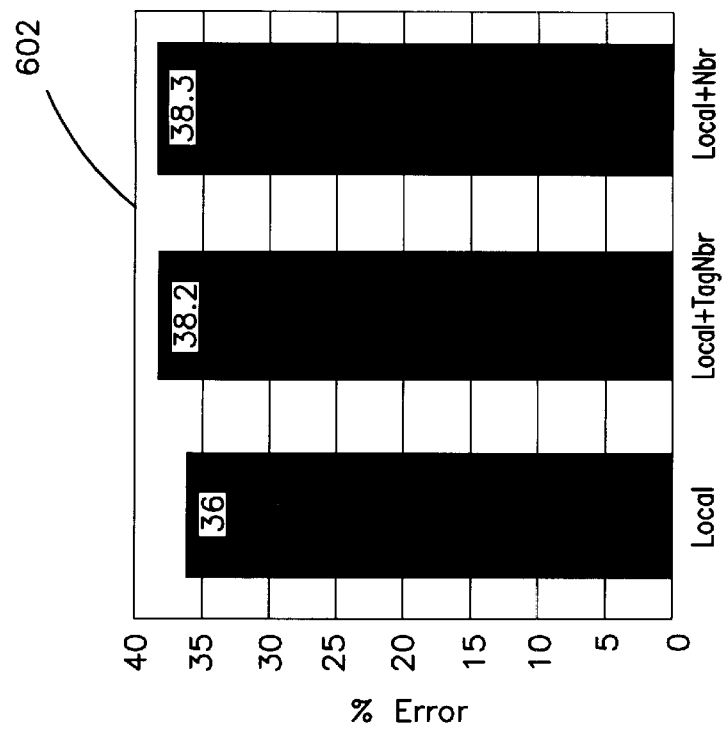
FIGS. 6A and 6B are graphs illustrating the results of using Local, Local+Nbr, and Local+TagNbr techniques to classify data.
Figure 6A:
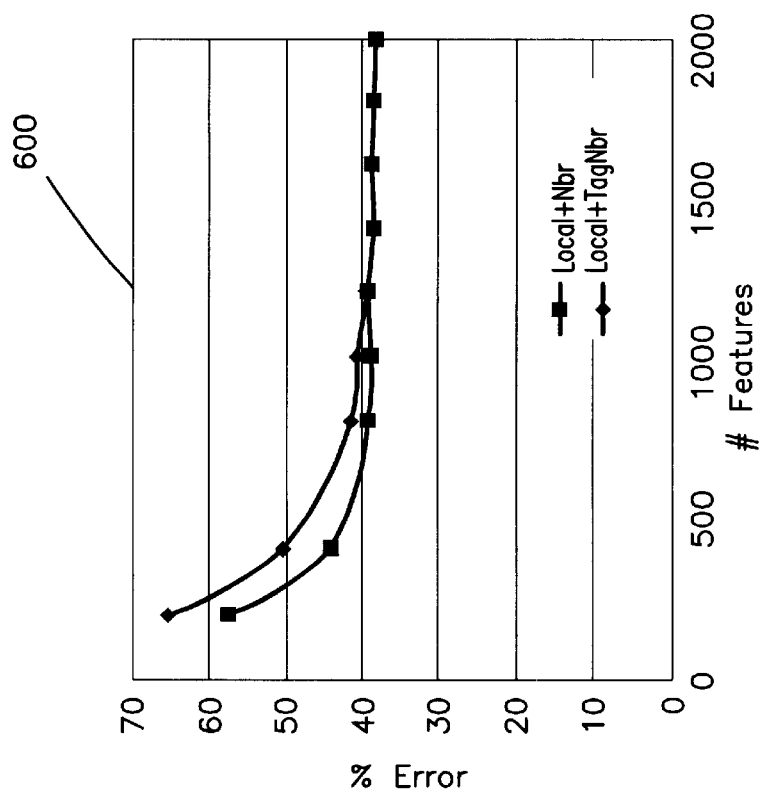

FIGS. 6A and 6B are graphs 600, 602 illustrating the results of using Local, Local+Nbr, and Local+TagNbr techniques to classify data. The results show that the error rate increases when the neighbor text is used and that tagging does not help to any appreciable extent.

Neighbor text decreased correct classification for two reasons. First, there were too many neighbors involved (i.e., an average patent has over 5–10 neighbors). Second, the term distribution may not have been sufficiently similar to the distribution of the "true" class of the patent.

Also, the above experiments found cross-linkage from the patent leaf classes Regulator and System to Transmission, from Modulator to Oscillator, etc. This was expected. In fact, in some cases Web pages of all descriptions and all topics link to popular sites (i.e., "this site is best viewed with" or "this site was created using"). Including terms such as these from neighbors might easily lead to misclassification.

Moreover, a sufficiently powerful feature selection mechanism was to have dealt with the huge space of terms generated by tagging. Even without the tagging, the dimensionality of text is so large that with typical training set sized, there is no guarantee that term distributions will be "learned".

First, there is the problem of the original document $\delta_i$ getting swamped with terms from "large" neighbors. Various term weighting schemes may be proposed. For example, one might include terms in $\delta_i$ itself each with weight 1, terms in radius-one neighbors each with weight ½, terms in radius-two neighbors with weight ¼, and so on. Existing term weighting schemes in IR are already mostly heuristic. In the linked case, it is difficult to set the weights. Depending on how fast the weights decay with distance, spurious terms may lead to misclassification (i.e., if the non-local terms have high weight) or informative remote terms may be neglected.

Second, consider the noisy neighbor scenario. It may be difficult to identify links that lead to useful neighbors only. A simple heuristic is to restrict the expansion to out-links within the site or domain. This, however, may miss valuable information in at least two forms, for example, a highly informative link from the Database group at the University of Wisconsin to IBM may be ignored, as will the observation that many students at Stanford University link to both the University of Washington and IBM may be ignored, thus inducing an implicit topical similarity between them.

5.1 Using Class Information from Pre-Classified Neighbors

Noting that text from neighbors is too noisy to help classification, this section explores the following thesis: if the classes for all documents neighboring $\delta_i$ were known, then replacing each hyperlink $\delta_i$ in a document to be classified with the class identifier of the corresponding document could provide a highly distilled and adequate representation of $\delta_i$'s neighborhood.

The hypertext classifier 110 makes use of the neighbor class labels in this way. The general form for the text-based classifier is that shown in Equation (4) in the above discussion of the general model. As was mentioned previously, Pr(G,T) can be dropped and C can be chosen to maximize Pr(G,T|C) and Pr(C). This results in a computationally feasible procedure for finding the global maximum of their product as a function of C. Even if these functions are not known a priori, if their functional/parametric forms are known, a suitable learning procedure (i.e., to estimate the parameter values) is available, and a feasible optimization procedure is available, a computationally feasible procedure for finding the global maximum of their product as a function of C is possible.

In a typical situation the functional forms are frequently "guessed", with functional forms being selected that (1) appear to have sufficient degrees of freedom to describe the necessary inter-class decision boundaries and (2) for which feasible learning (estimation) and optimization techniques are available. In a specific problem it will not, in general, be possible to satisfy both of these simultaneously. This may be due to the models and techniques available or the more fundamental problem of "intrinsic confusion" where the classes overlap in the feature space corresponding to the features chosen for performing classification.

First, the problem of classifying a single document $\delta_i$ is considered, where it is assumed that all the classes of all of the document's immediate neighbors are known. The Bayes classifier is used to perform this classification. That is, a $c_i$ is chosen to maximize $Pr(c_i|N_i)$, where in this context, $N_i$ represents the collection of all the known class labels of all the neighbor documents. This collection can be further decomposed into in-neighbors and out-neighbors, $N_i = \{I_i,$ $O_i\}$. Manipulation of this collection using Bayes' Law, as was done in Equation (4) for the general model for C, leaves the problem of choosing $c_i$ to maximize, in the following Equation (6):

$$Pr(N_i|c_i)Pr(c_i)$$

The estimate for $Pr(c_i)$ is simply the frequency of the class $c_i$ in the training corpus. For $Pr(N_i|c_i)$, independence of all the neighbor classes is assumed. This results in the following Equation (7)

$$Pr(N_i | c_i) = \prod_{\delta_j \in I_i} Pr(c_j | c_i, j \to i) \prod_{\delta_j \in O_i} Pr(c_k | c_i, i \to j).$$

The following notation is used to represent the terms in these products:

$\pi(c_i) \equiv Pr(c_i)$ $\phi(c_j, c_i|I) \equiv Pr(c_j|c_i, j \to i)$ $\phi(c_j, c_i|O) \equiv Pr(c_j|c_i, j \to i)$ $n(\gamma_j, i|I) \equiv$ the number of $\delta_i$'s in-neighbors that have class label $\gamma_j$ $n(\gamma_j, i|O) \equiv$ the number of $\delta_i$'s out-neighbors that have class label $\gamma_j$ Using this notation and rewriting Equation (7) as a product over classes rather than neighbors yields the following form for Equation (6), which is denoted Equation (8):

$$Pr(N_i | c_i)Pr(c_i) = \pi(c_i) \prod_{j=1}^{m} [\phi[\gamma_j, c_i | I)]^{n(\gamma_j, i|I)} [\phi(\gamma_j, c_i | O)]^{n(\gamma_j, i|O)},$$

which is the same Bernoulli form used for text.

5.2 Iterative Relaxation Labeling of Hypertext Graphs

The problem of classifying a hypertext document using both its own text and that of its neighbors has been discussed. Also, the problem of using the class labels of pre-classified neighbors was discussed. In this section, use of all three (document text, neighbor text, and neighbor classes) are discussed in a realistic setting wherein only some or none of the neighbor classes are known. In the cases in which the neighbor classes are known a priori, the known class labels are used as the sole feature representation of the associated documents. Where the neighbor classes are not known, on the other hand, the text and link structure of the entire collection $\Delta$ in a type of "iterative relaxation" (i.e., "relaxation labeling") scheme is used.

Before considering this complete problem, the combined use of known higher classes and terms from only the document to be classified is discussed. It is assumed that there is no direct coupling between the text of a document and the classes of its neighbors. It is also assumed that there is only an indirect coupling through the class of the document itself. This assumption can be expressed precisely using the following conditional probabilities:

$$Pr(N_i, \tau_i|c_i) = Pr(N_i|c_i)Pr(\tau_i|c_i).$$

Following the discussion of previous sections, the resulting classifier can be written as:

$$c_i = \arg\max_\gamma [Pr(N_i|\gamma)Pr(\tau_i|\gamma)Pr(\gamma)]$$

where the Bernoulli forms for the components of this equation can be obtained from equations (3), (8) and γ is a dummy class-label variable for $c_i$.

If all the classes of the neighbors are known a priori, this is the classifier that is used. If, as is usually the case, some or all of the neighbor classes are known, the problem can be approached in many ways, including the following:

1. Initially, classify the unclassified documents from the neighborhood (for example, by using a text-based classifier), and then use this knowledge to classify a given document. This procedure can be performed iteratively, to increase the quality of the classification. This iteration constitutes a kind of relaxation labeling, a technique that has been applied extensively in the computer vision and image processing fields. The iteration continues until a stopping criteria is reached (e.g., stability, consistency, or a selected number of iterations).

There are two variants of this relaxation approach:

Hard classification: after each step, each document from the neighborhood is assigned only one class. This is known as "discrete relaxation".

Soft classification: after each iteration, all documents are assigned a vector containing estimated probabilities of belonging to each class. This is known as "stochastic relaxation". 2. Ignore unclassified pages. 3. Use domain knowledge to extract the information from the classified pages in the neighborhood.

The first method seems to be most powerful, however it has several drawbacks. First, it is computationally very expensive, as it requires an order of magnitude more classifier calls, multiplied by the number of iterations.

Let $\Delta_K$ symbolize everything that is known about $\Delta$. Using the previous notation, $\Delta_K = \{G, T, C_K\}$. Using this the unknown classes $C_U$ will be estimated. In particular, let $\Delta_U$ represent the corresponding documents (i.e., those whose classes are unknown). To classify a single document $\delta_i$, $c_i$ is chosen to maximize $Pr(c_i|\Delta_K)$. Note that, letting $N_i^U \equiv N_i \cap \Delta_U$, this can be expressed as the following Equation (9):

$$Pr(c_i|\Delta_K) = \sum_{N_i^U \in \Omega_i} Pr(c_i N_i^U|\Delta_K)$$
$$= \sum_{N_i^U \in \Omega_i} [Pr(c_i|N_i^U,\Delta_K)Pr(N_i^U|\Delta_K)],$$

where $\Omega_i$ is the set of all possible class labels of the documents in $N_i$. There are $m^k$ of these where k is the number of documents in $N_i$.

To make Equation (9) more manageable, the following approximations/assumptions are made: 1. Limited range of influence:

$$Pr(c_i|N_i^U,\Delta_K) = Pr(c_i|N_i^U,N_i^K),$$

where $N_i^K = N_i \cap \Delta_K$. This is equivalent to assuming a first-order Markov Random Field, which is described in R. Chellappa and A. Jain, "Markov Random Fields: Theory and Applications", Academic Press, 1993.

2. Also, independence is assumed among the neighbor class probabilities:

$$Pr(N_i^U|\Delta_K) = \prod_{\delta_j \in N_i^U} Pr(c_j|\Delta_K).$$

With these approximations, the collection of all equations, such as Equation (9), constitute a coupled system of equations in which the variables are the probability estimates: $\{Pr(c_i|\Delta_K), i=1, 2, \ldots, n\}$, which suggests the following iterative solution in Equation (10):

$$Pr(c_i|\Delta_K)^{(r+1)} = \sum_{N_i^U \in \Omega_i} \left[ Pr(c_i|N_i^U,N_i^K) \prod_{\delta_j \in N_i^U} Pr(c_j|\Delta_K)^{(r)} \right]$$

where r is the iteration index. Note that $\Delta_K$ includes all the text T. The link structure G and the known classes $C_K$ and $N_i^K$ include the corresponding subsets of these. The way in which this information is applied in this estimation problem is controlled by the function $Pr(c_j|N_i^U,N_i^K)$. Here, the Bernoulli forms of equations (3) and (8) are used. Some further approximations are made to make evaluation of the sum in equation (10) tractable.

A final note regarding equation (9), it was written in terms of only the immediate neighbors $N_i = \{N_i^U, N_i^K\}$, but it can be extended to larger neighborhoods—link distance two and beyond. This would constitute a higher-order Markov Random Field assumption.

Figure 7:
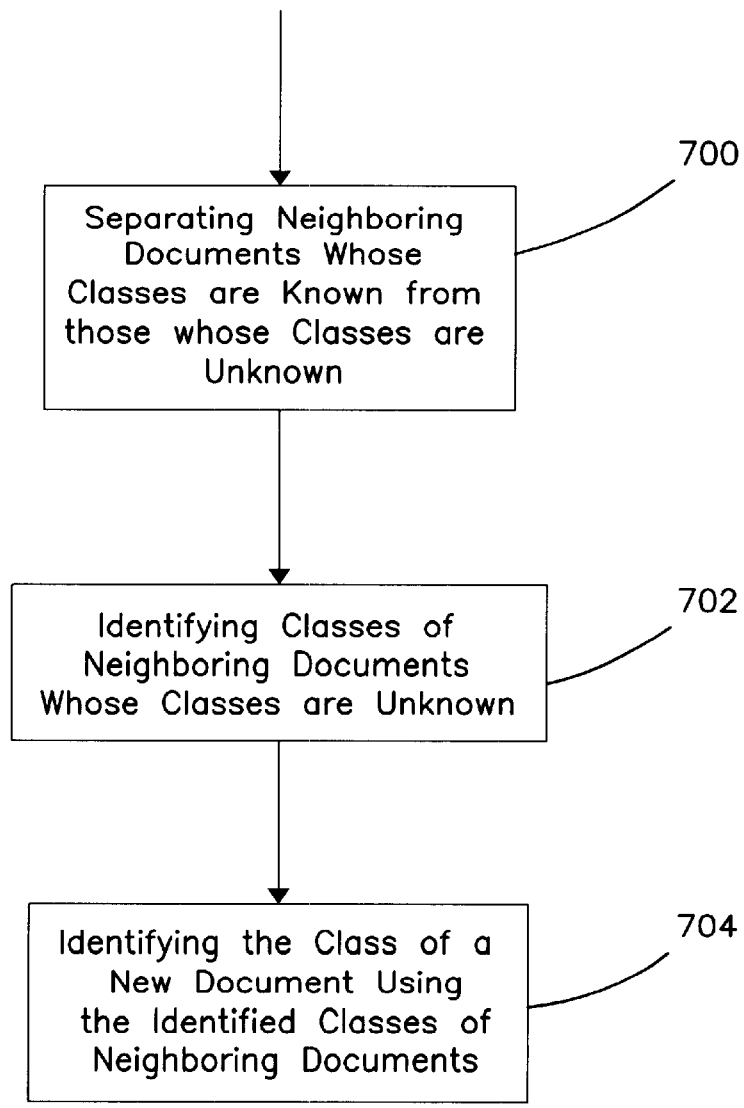
FIG. 7 is a flow diagram illustrating the steps performed by the hypertext classifier to perform iterative relaxation for a radius-one neighborhood in one embodiment of the present invention.

FIG. 7 is a flow diagram illustrating the steps performed by the hypertext classifier 110 to perform iterative relaxation for a radius-one neighborhood in one embodiment of the present invention. In Block 700, the hypertext classifier 110 separates neighboring documents whose classes are known from those whose classes are unknown. In Block 702, the hypertext classifier 110 identifies classes of neighboring documents whose classes are unknown. In Block 704, the hypertext classifier 110 identifies the class of a new document using the identified classes of neighboring documents.

5.3 Experiments and Performance

This section discusses a series of experiments with patents. The first set of experiments deal with the case in which the classifier can query the "true" class of any document, except for the one that is being classified. The goal is to design a classifier that can use both local text and links to immediate neighbors to its advantage. This is called a "completely supervised" scenario. The second set of experiments deal with the case in which the classes of only a fraction of the documents in the vicinity of the test document are known to the classifier. This involves the relaxation scheme described earlier, and is called the "partially supervised" scenario.

5.3.1. The Completely Supervised Scenario

The following options are compared using the patent corpus:

Text: Only local text is used for training and testing.

Link: The only document features are the class names of neighboring patents.

In the patent server, as well as, for example, Yahoo!™, class names are paths in a topic hierarchy, such as in the following example:

[29][METAL WORKING]
 [29/1.2][PROJECTILE MAKING]
  [29/1.221][.Bullet or shot]
   [29/1.231][..Jacketed or composite]

Here, the first brackets "[ ]" contains the numeric class code and the second bracket contains the descriptive string. The features are the full path names, for example, /29/X/Y/Z.

These paths can be longer and more focused than in a two-level dataset.

Prefix: All prefixes of the class path are included as features, for example, /29, /29/X, /29/X/Y, and /29/X/Y/Z.

Test+Prefix: One classifier is run that uses only local text, and another classifier is run that uses only the class prefixes above. The probabilities are combined as if the join distribution of term and link frequency is a product of their marginal distributions. This results in a hybrid classifier.

Figure 8:
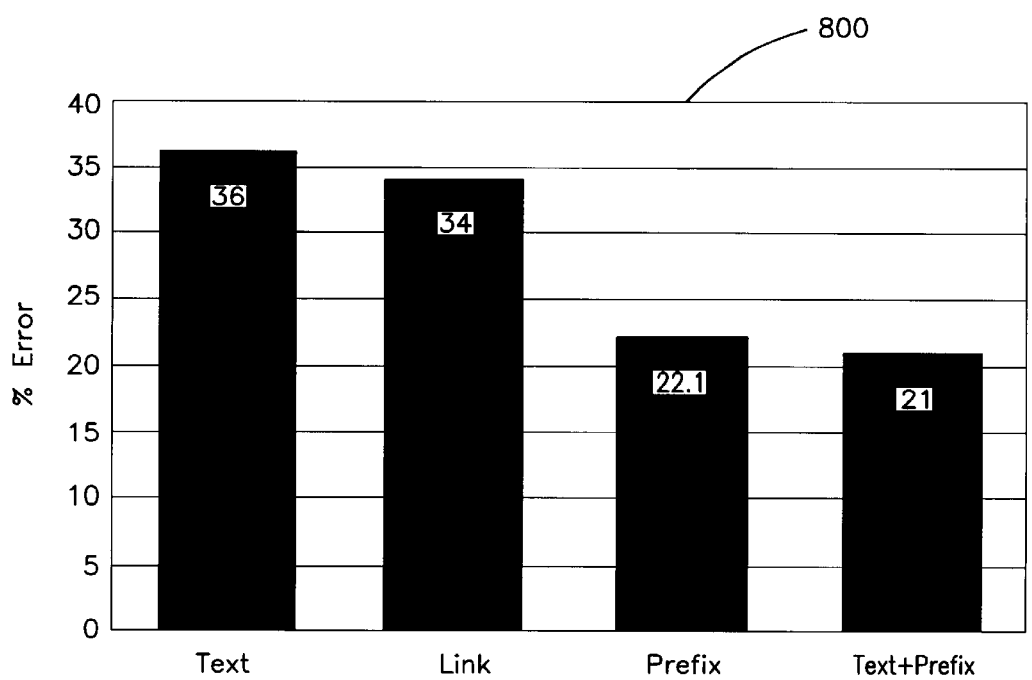
FIG. 8 is a graph illustrating a comparison of error rates for Test, Link, Prefix, and Test+Prefix experiments.

FIG. 8 is a graph 800 illustrating a comparison of error rates for Test, Link, Prefix, and Test+Prefix experiments. In the graph 800, the text baseline, as before, is 36% error. Using links in the form of full paths gives negligible benefit, with the error being 34%. A dramatic effect is seen with Prefix, in which case the error drops to 22.1%. The combined Text+Prefix option improves on this slightly to give an error of 21%.

In this example, the feature selection mechanism is exploited well. The Link option performs worse than expected because the features (i.e., full class paths) are too detailed and occur too rarely to become strong signals. However, when a classifier receives all prefixes, the classifier can discard paths that are too short (i.e., which are almost equally frequent in all documents) or that are too long (i.e., which are too infrequent to be statistically significant).

5.3.2 The Partially Supervised Case

This section discusses the realistic scenario in which only a fraction of the documents in the vicinity of a test document have classes known to the classifier. When only a fraction of the document have classes, the iterative relaxation based classification discussed above is modified.

Let Ni be a set of neighbors of document (node) i in a hypertext graph. Each of these neighbors can potentially belong to any class. Thus, there are many possible assignments of the neighbors to classes. If there are k neighbors and $|\Gamma|$ classes, the neighbors could be in any of $|\Gamma|^k$ configurations. Let $\omega_i$ be a configuration of neighbors of node i, and let $\Omega_i$ be the space of possible configurations. The following Equation (11) is an iterative equation for the probability that document i is from class $\gamma_j$:

$$Pr^{(r+1)}[\delta_i \in \gamma_j] = \sum_{\omega_i \in \Omega_i} Pr^{(r)}[\omega_i] \cdot Pr^{(r)}[\delta_i \in \gamma_j | \omega_i]$$

This relaxation converges to a locally consistent assignment provided that it is initiated "close enough" to such a consistent state, discussed in "Pelkowitz". As in the discussion of the completely supervised case, it is assumed that $Pr[\omega_i]$ is the product of probabilities of the appropriate class assignment of each neighbor of $\delta_i$. Similarly, the completely supervised case provides a technique for estimating $Pr[\delta_i \epsilon \gamma_j | \omega]$ for each j, once the configuration $\omega_i$ is fixed. The only problem is that the sum has an enormous number of terms. However, most of the configurations $\omega$ are highly improbable.

Figure 9:
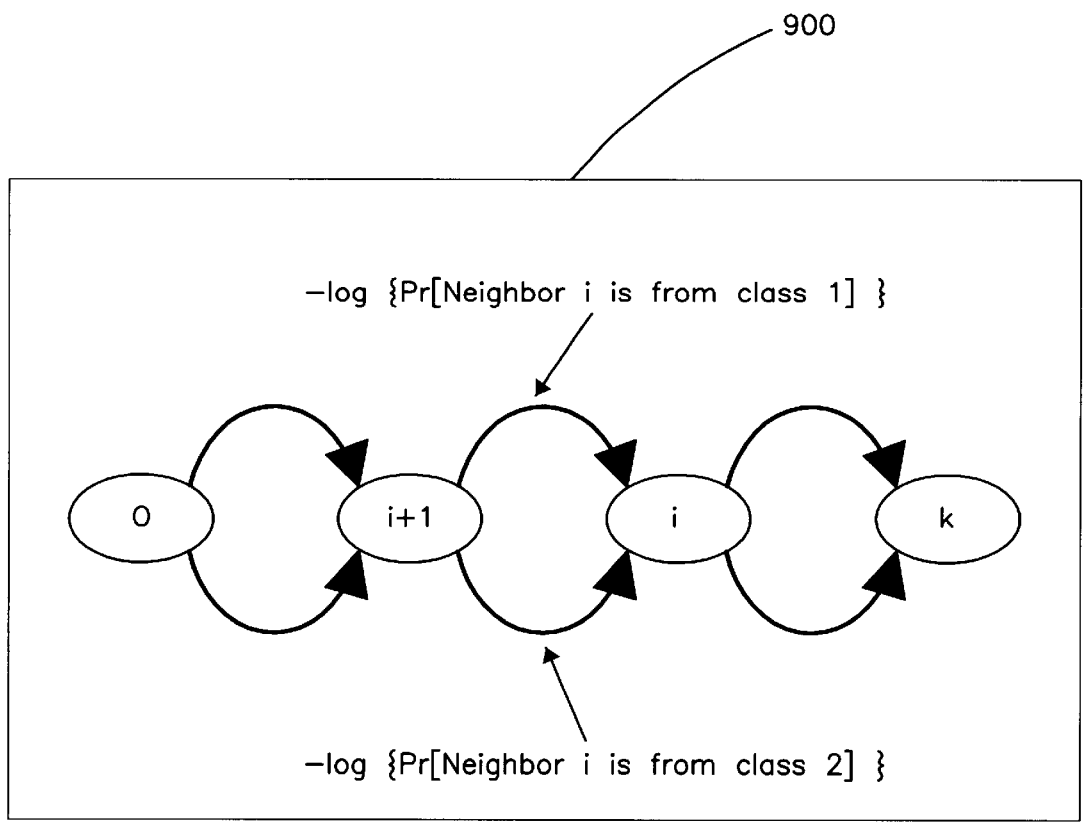
FIG. 9 is a hypertext graph illustrating nodes connected by edges.

FIG. 9 is a hypertext graph 900 illustrating nodes connected by edges. For simplicity, let there be $|\Gamma|=2$ classes. There are nodes numbered 0, . . . , k, and two edges from node i–1 to i. One edge corresponds to the case in which the i-th neighbor belongs to class $\gamma_1$, the other, for class $\gamma_2$. Suppose these edges were annotated with edge weights, which are the negative of the logarithm of the probability of the respective class assignment. Then the shortest path from 0 to k corresponds to the largest probability configuration.

Observe that although there are $2^k$ neighbor configurations, it is easy to find the highest probability configuration in time $O(k \log k+k|\Gamma|)$ time via a shortest path computation. It also turns out that the shortest P paths can be extracted in time $O(k|\Gamma|\uparrow=k \log k+P \log P)$, discussed in D. Eppstein, "Finding the k Shortest Paths", Symposium on the Foundations of Computer Science, IEEE, 1994, which is incorporated by reference. This does not appear to affect the accuracy of classification using Equation (11). Typically, after the top two or three class choices, the remaining classes have probabilities as low as $10^{-30}$, which are beyond floating point precision. It is important to use a great deal of care in computing all probabilities, especially for Equation (11), without losing precision.

Figure 10B:
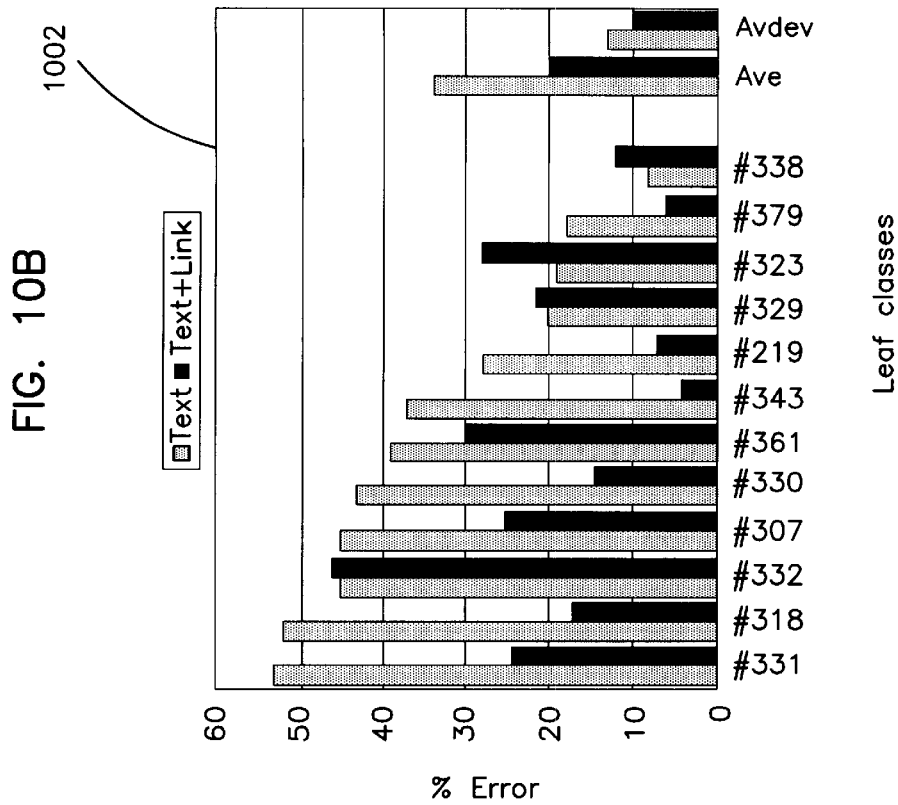
FIGS. 10A and 10B are graphs illustrating the results of relaxation labeling based hypertext classification.
Figure 10A:
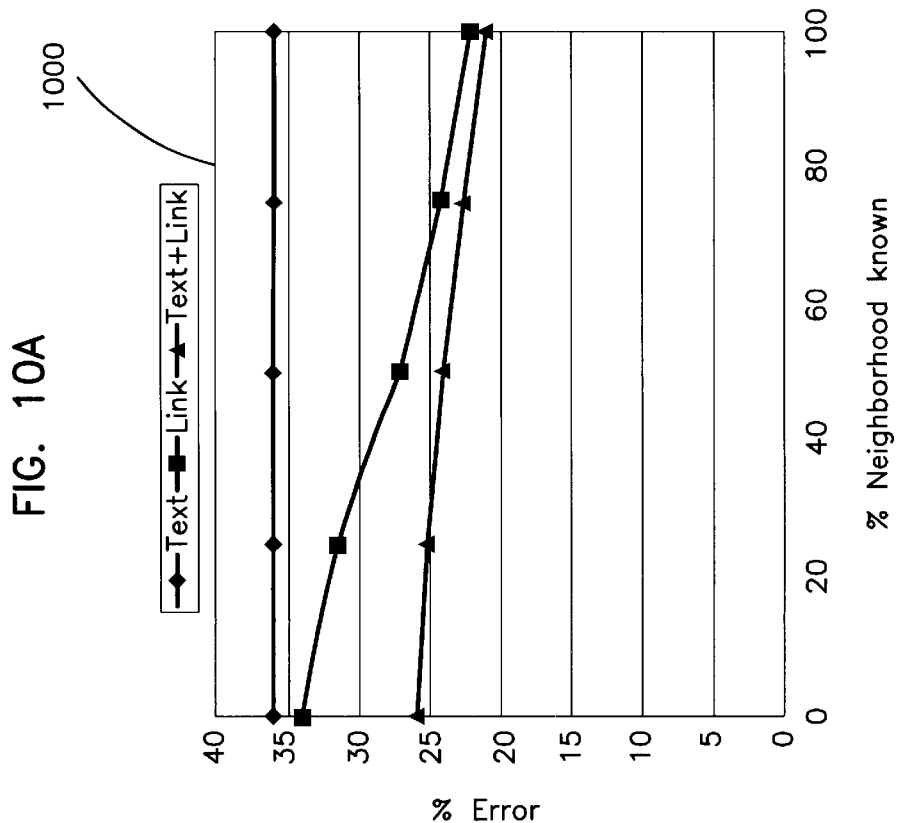

FIGS. 10A and 10B are graphs 1000, 1002 illustrating the results of relaxation labeling based hypertext classification. The graph 1000 of FIG. 10A compares the error percentages for Text, Link, and Text+Link experiments. The x-axis is the percentage of documents in the neighborhood of the test document whose true classes are revealed to the classifier on demand. These are chosen uniformly at random from the neighborhood. The y-axis is the error rate for three schemes, text only, link only, and combined text and link. The link and combined text and link schemes are "seeded" by a text-only classifier.

Since the text-based classifier does not use links, its error rate is fixed. There are a number of interesting points to note about the other plots. Obviously, adding link information is significantly boosting accuracy, cutting down error by up to 42%. More importantly, the benefits are seen even when only a relatively small fraction of the neighborhood has known classes. There is a graceful variation in the overall accuracy as this fraction varies. The text-based and text-and-link-based classifiers use of the order of 50,000 features. In contrast, the link-based classifier uses only 15 (for this taxonomy). Thus link-based classifier has a tiny footprint and is very fast. However, link-based classifier does well only when a reasonably large fraction of the neighborhood has known classes. The combined text and link classifier always beats link classifier by some margin, but this could be small at the completely supervised end of the spectrum. The combined text and link classifier is also stabilized by text at the extreme where the neighborhood is completely unknown. The combined text and link classifier is the more stable relaxation method, but may be computationally more expensive.

What is most intriguing is that even in the most unfavorable setting of zero knowledge about the neighborhood, using only a link-based iteration scheme, and seeding it only once using local terms, a small but visible increase in accuracy is seen (between text and link at 0%). This gain is entirely from implicit constraints imposed on the probability models by the link structure.

The graph 1002 of FIG. 10B illustrates a class-by-class break-down of the differences in accuracy between text and the combined text and link. The break-up of the performance over 12 different leaf patent classes is shown. Perhaps it should come as no surprise that the improvement is diverse, in cases it is negative. This depends on the linkage behavior between different classes. It is interesting that apart from reducing average error across classes, the relaxation scheme reduces (by about 26%) the average deviation of error across the classes.

6. The Radius-Two Specialization

The hypertext classifier 110 is able to classify a document for any radius of influence, but, for illustration only, the following discussion will describe a radius of influence of two (i.e., a radius-two specialization). In a homogenous corpus such as the patent database, it is meaningful to assign each patent to a class, and to estimate parameters, such as the expected fraction of outlinks from documents in one class that point to documents belonging to another class. In contrast, the Web is so diverse that no topic taxonomy can hope to capture all topics in sufficient detail. There will always be documents, in the vicinity of the documents of interest to a user or to the classifier, that cannot be meaningfully classified into the "known universe." A cursory measurement shows that only about 19% of Yahoo!™ documents have an in-link from some other Yahoo!™ document. Only 28% have an out-link to some Yahoo!™ document and about 40% have some link with another Yahoo!™ page.

Exploring larger neighborhoods on the Web have benefits and disadvantages. The benefits of finding a few known neighbors may be offset by noise or strong, but incorrect, signals collected in the process. For example, a large fraction of Web pages point to popular sites, such as Netscape or Alta Vista, even though the topic of these sites may be completely unrelated.

6.1 Bridges "Co-citation" is a well-studied phenomenon in implicitly linked corpora, such as academic papers, as discussed in G. Salton and M. J. McGill, "Introduction to Modern Information Retrieval", McGraw-Hill, 1983, which is incorporated by reference herein. Documents that cite or are cited by many common documents may be regarded as similar, much as documents sharing many terms are adjudged similar. Citation-based similarity, or a combination of citation and term-based similarity, can then be used to perform unsupervised clustering of documents, discussed in R. Weiss, B. Velez, M. A. Sheldon, C. Nemprempre, P. Szilagyi, A. Duda, and D. K. Gifford, "HyPursuit: A Hierarchical Network search Engine that Exploits Content-link Hypertext Clustering", Proc. of the Seventh ACM Conference on Hypertext, Washington, D.C., March 1996, which is incorporated by reference herein.

Figure 11:
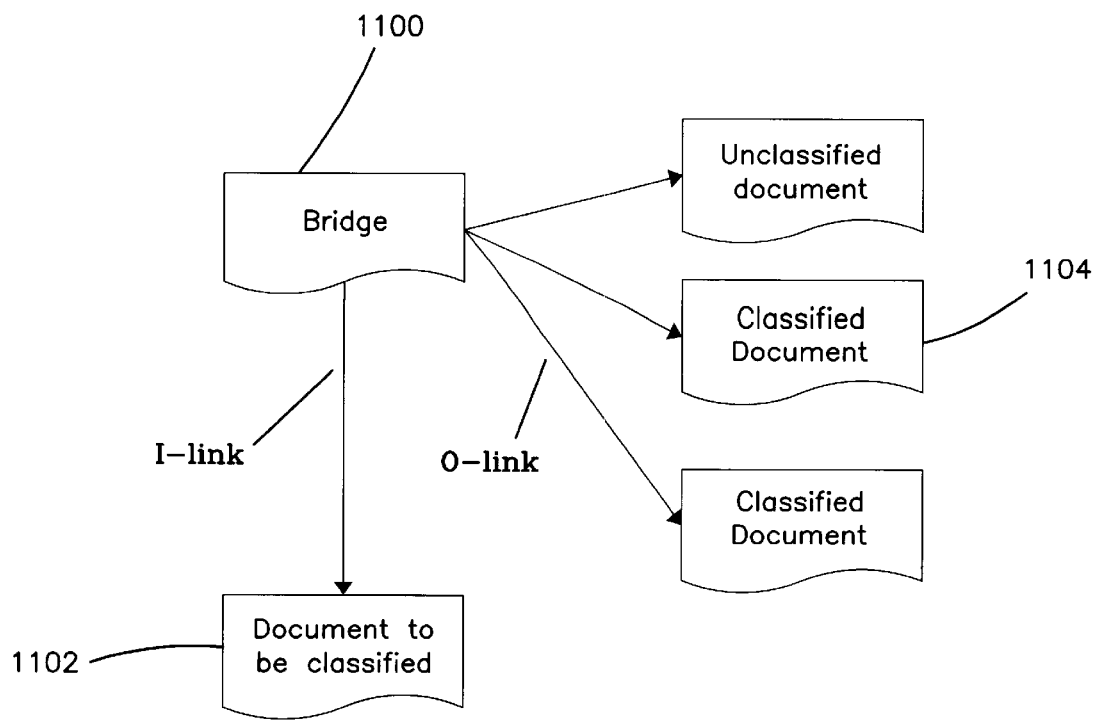
FIG. 11 illustrates a notion of bridging connected documents.

These common documents, called "bridges" or "bridge documents", hint that two or more pages have the same class, while not committing what that class could be. FIG. 11 illustrates a notion of bridging connected documents. For example, a bridge 1100 connects two documents $\delta_I$ 1102 and $\delta_2$ 1104. Documents 1102 and 1104 are said to be "bridge-connected" because there exists a document β 1100 pointing to both $\delta_I$ 1102 and $\delta_2$ 1104, where β is the bridge 1100. As a link is followed from $\delta_I$ 1102 and $\delta_2$ 1104, an Inlink to β 1100 is traversed from one document 1102, followed by traversing an Outlink to the other document 1104. This is called an IO-path and β is called an IO-bridge 1100 for $\delta_I$ 1102 and $\delta_2$ 1104.

Figure 12:
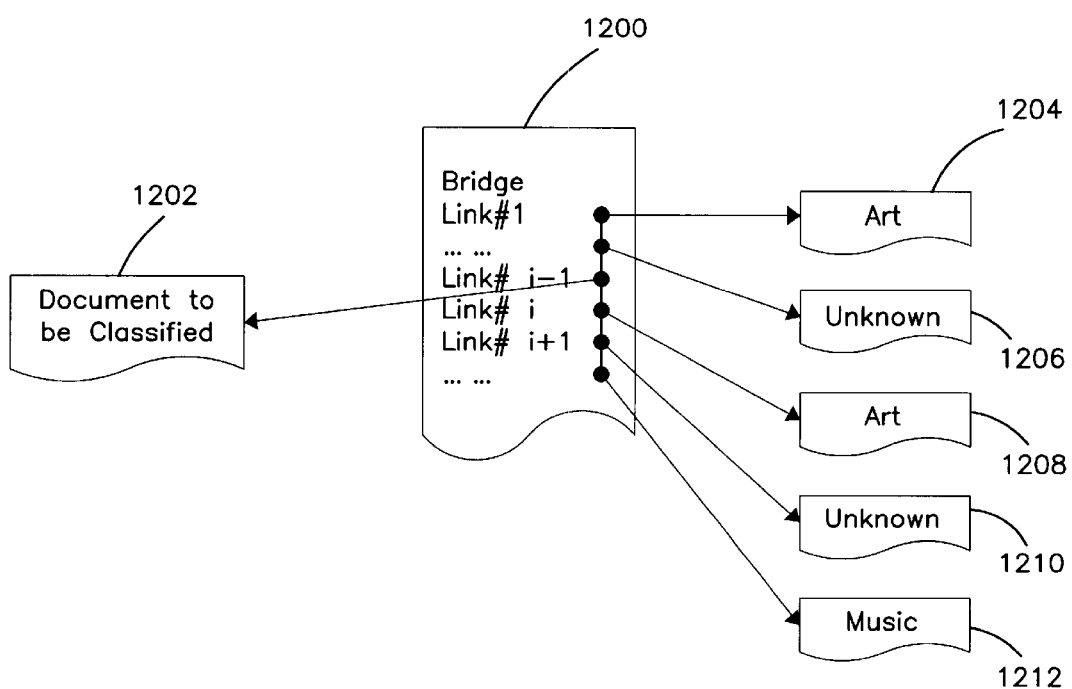
FIG. 12 illustrates the use of a bridge to classify a document.

FIG. 12 illustrates the use of a bridge 1200 to classify a document. Document 1202 is to be classified using the bridge 1200. The bridge 1200 contains a number of links to various documents with classes, including an Art class 1204, 1208, a Music class 1212, and an Unknown class 1206, 1210. The document 1202 to be classified is bridge-connected connected to multiple documents classified in an Art class 1204, 1208, and so the document 1202 could be classified in the Art class.

The choice of IO-paths, out of the four possibilities II, OO, IO, and OI, is guided by domain knowledge. The difference between I and II, or O and OO, is one degree. Of IO and OI, IO appears to be more meaningful, considering that approximately 80% of the Web documents are OI-bridged to each other because they all point to Netscape. Fortunately, IO-bridges abound on the Web. In fact, every topical "resource page" is a potential bridge. The Yahoo!™ site thus include thousands of bridges of all sorts of topics. The results of the following experiment hints that bridges can be a powerful support for link-based classification.

In the experiment, for each page δ in a Yahoo!™ sample, all pages $\delta_1 \ldots \delta_k$ are considered to be pointing to it. Each page $\delta_i$ is regarded as an ordered list $O_i$ containing the out-links of $\delta_i$. Some of the out-links in $O_i$ point to pages not known to Yahoo!™. For each out-link in $O_i$ that pointed to a Web page δ'≠δ contained in Yahoo!™, it is determined whether the class of δ and δ' are the same. If the classes are the same, the pair (δ,δ') is called "coherent". (δ'-δ)$O_i$ is the difference between the positions of δ and δ' in $O_i$. This is negative if the out-link to δ' occurs before that to δ and vice-versa. Finally, for each integer D, a fraction of coherent pairs were computed among all pairs (δ',δ) for which (δ'-δ)$O_i$=D for some I.

Figure 13:
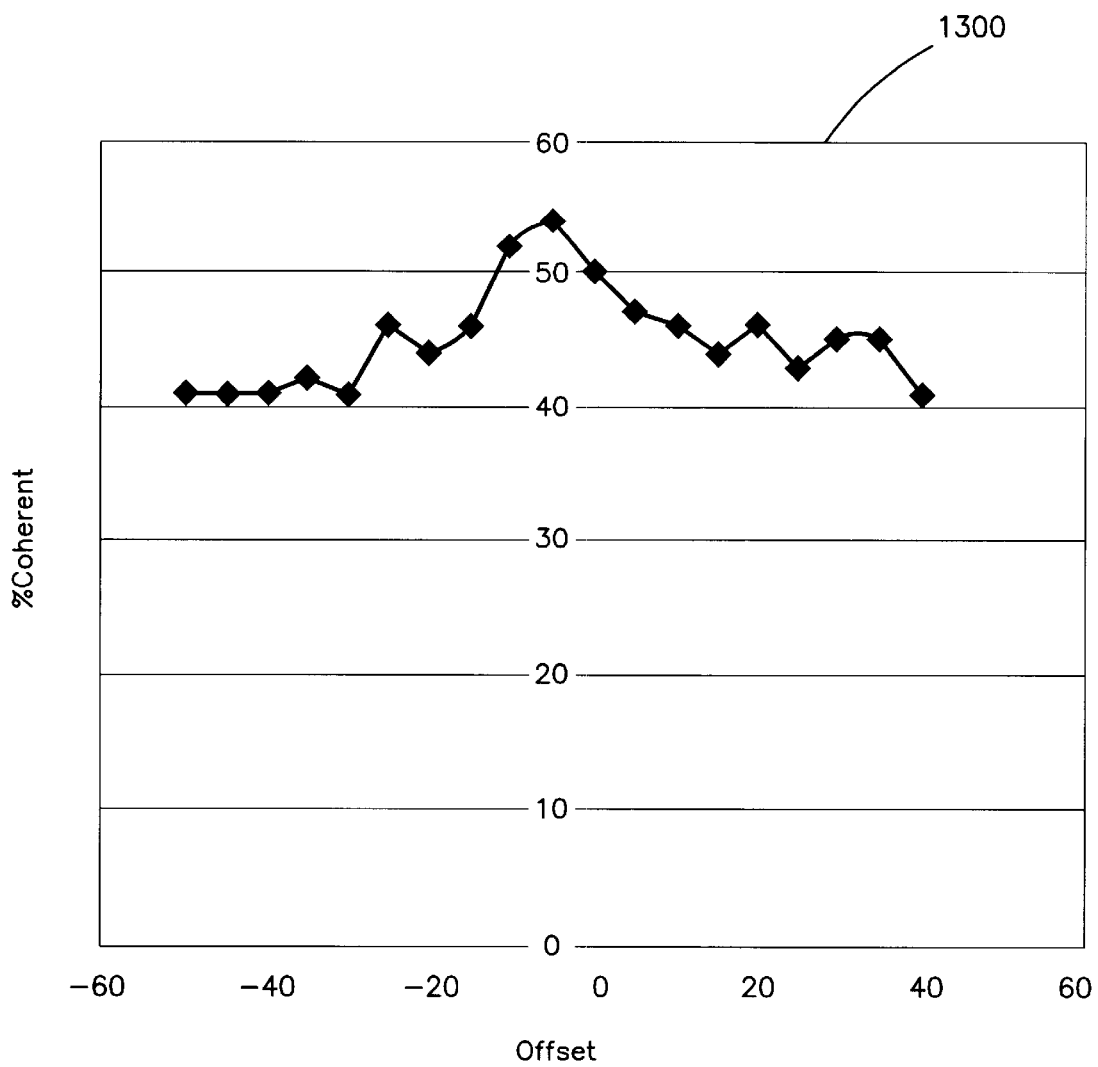
FIG. 13 is a graph illustrating the results of an experiment using a bridge.

FIG. 13 is a graph 1300 illustrating the results of an experiment using bridges. The graph 1300 plots an estimate of the probability of staying on the same topic as δ as a user moves off before and after the link to δ in some page pointing to δ. Two aspects of the graph are worth noting. First, the probability appears not to vanish to zero as a user moves farther away from the link to δ, which means that many long bridges are almost "pure" (e.g., they point to pages from the same Yahoo!™ topic). Second, there is a peak near zero, which implies that outlinks near the one to δ are more likely to be the same topic as δ.

Recall the general framework in which a neighborhood is grown around the test document and then classes are assigned iteratively to each document in a manner influenced by other documents in its "radius of influence", which was at most one. In the following discussion, IO-bridges are used to exert influence at radius-two. The experimental setup is as follows.

1. A sample of documents from Yahoo!™ are considered, such that each is IO-bridged to at least one other page in Yahoo!™ (In this experiment normal terms are not considered to be features, so pages are used that have links to them.) This set is randomly divided into 70% for training and 30% for testing, which results in approximately 594 training and about 255 testing documents. Although this is not typically enough for text-based classification, the small feature space made this small dataset usable.

2. For training, the following features from each document δ are used. The documents in the training or testing set that are IO-bridged to the document under scrutiny are looked at. These have known class paths in topic taxonomy. All prefixes of these paths are used to augment an engineered document δ'.

3. For testing, the class paths for all documents in the training set are used that are IO-bridged.

4. These features are input to a text-based classifier, as usual.

5. The above scheme is compared with a purely term-based classification of the same test set using the text-based classifier and the same training set as above.

Figure 14B:
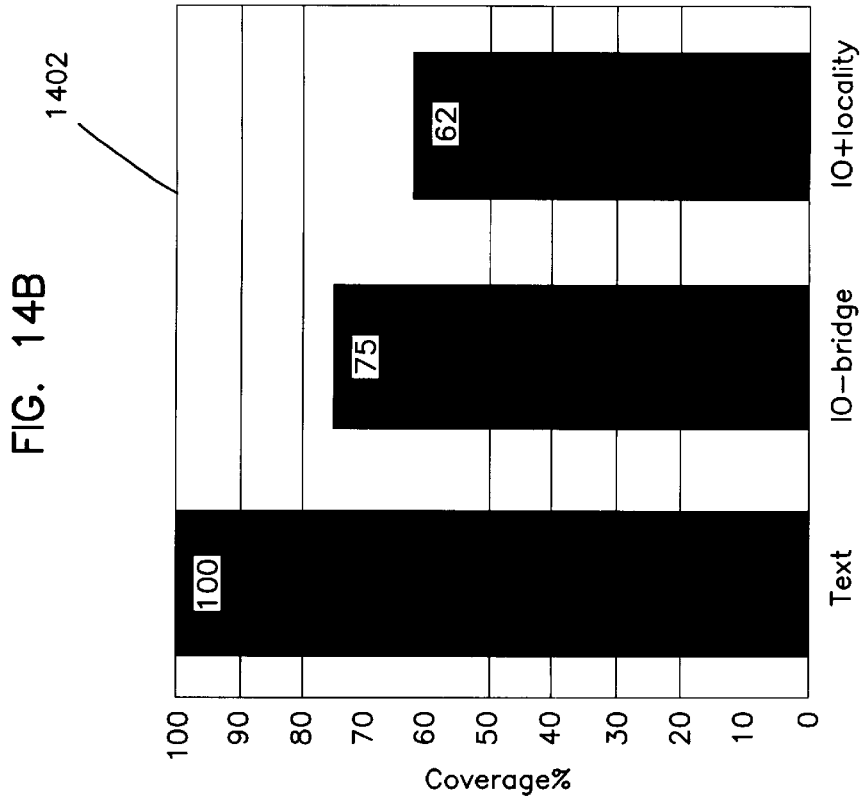
FIGS. 14A and 14B are graphs illustrating the results of the comparison of a pure text-based classifier with two versions of a pure link-based classifier that uses IO-bridges.
Figure 14A:
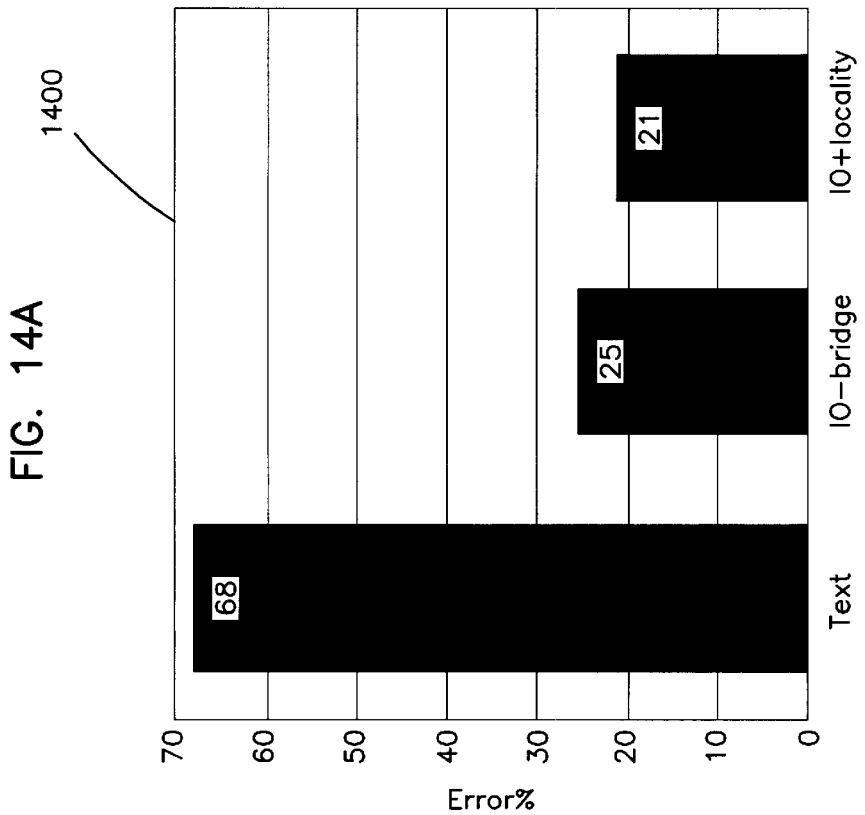

FIGS. 14A and 14B are graphs 1400, 1402 illustrating the results of the comparison of a pure text-based classifier with two versions of a pure link-based classifier that uses IO-bridges. The graph 1400 illustrates error percentages, and the graph 1402 illustrates coverage percentages. The link-based classifiers use orders of magnitude fewer features (e.g., 14 rather than 14,0000). The first link-based classifier uses IO-bridges and reduces error rate from 68% to 25%.

The second link-based classifier exploits locality in IO-bridges and reduces error rate by 21%. Owing to a variety of factors (fewer terms per document, diverse authorship, unused hyperlinks), the pure text-based classifier performs poorly, having an error rate of 68%. Furthermore, this error rate was achieved at a large feature set size of over 14,000 terms. It appears that this may be a basic limitation of text-based classification. A much more sophisticated classifier using Bayesian nets showed comparable performance with a comparable sample from Yahoo!™, as discussed in "Sahami". In contrast, the IO-bridge based classifier has excellent performance: it uses only 14 features (the class labels) and has only 25% error rate.

Figure 15:
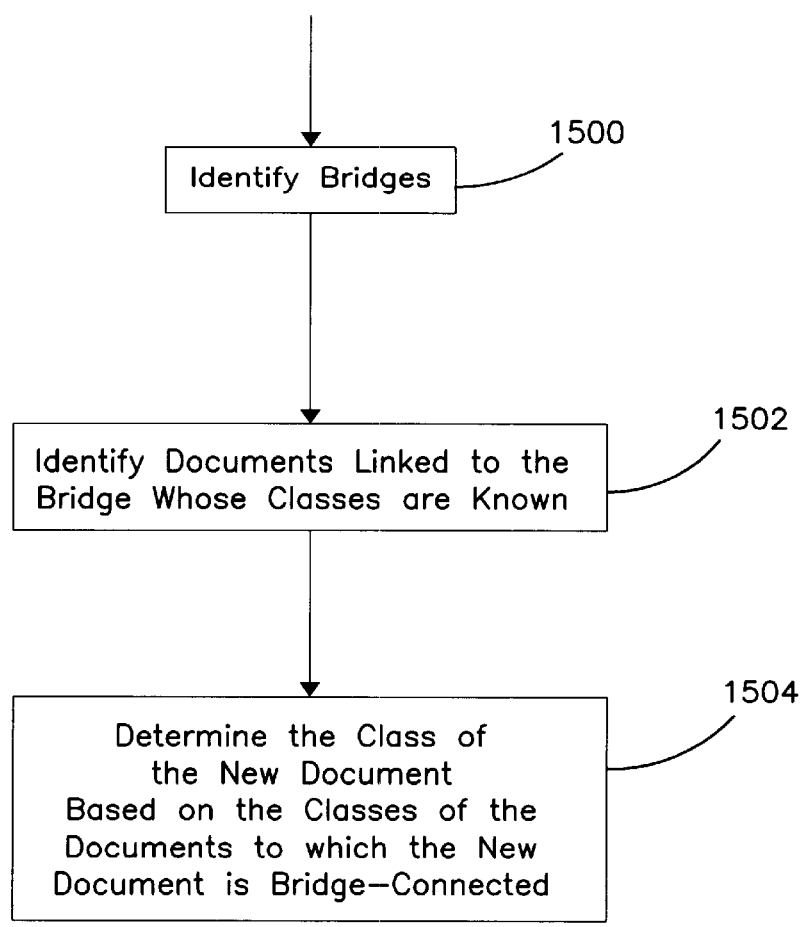
FIG. 15 is a flow diagram illustrating the steps performed by the hypertext classifier to use bridges within a radius-two neighborhood.

FIG. 15 is a flow diagram illustrating the steps performed by the hypertext classifier 110 to use bridges within a radius-two neighborhood. In Block 1500, the hypertext classifier 110 identifies bridges. In Block 1502, the hypertext identifier identifies documents linked to the bridge whose classes are known. In Block 1504, the hypertext classifier 110 determines the class of a new document based on the known classes of the documents to which the new document is bridge connected.

6.2 Locality in Bridges

Sometimes an IO-bridge may not be "pure". That is, the IO-bridge may include a sequence of topics, with many outlinks for each topic. Thus, such a bridge (i.e., bridge document) may need to be separated into segments, each of which points to pages with a coherent topic. For example, a personal hotlist may have a list of Physics resources followed by a list of Math resources.

Segmenting a Web page into intervals corresponding to coherent topics appears to be a difficult task. In conventional machine learning, techniques have been discovered for solving related, but simpler, problems. In these conventional systems, each segment is likely to be generated by a single coin, discussed in Y. Freund and D. Ron, "Learning Model Sequences Generated by Switching Distributions", Proc. of the Eighth Annual ACM Conference on Computational Learning Theory (COLT), pp. 41–50, 1995, which is incorporated by reference herein. These techniques already have high complexity (cubic or worse) which makes them inapplicable in a Web context.

Therefore, an "approximate" approach is followed. In particular, two sets of features are defined. One set of features is guaranteed to contain all bridge information, but can contain additional noise. The second set of features consists almost exclusively of bridge information, but is likely to be incomplete. The first option was explored in the previous section, and the following section will discuss the second option.

For, IO-bridges with locality, a class ID c is included as a "feature" for page $\delta$ if there exists an IO-bridge $\beta$ pointing to $\delta$ with three outlinks $\delta_{before}, \delta, \delta_{after}$ in that order, where the classes of $\delta_{before}$ and $\delta_{after}$ are known and equal, and no out-links between them point to a document with a known class. In other words, all pages $\beta$ pointing to $\delta$ are checked to determine whether the classes of the closest classified pages before and after the link to $\delta$ are equal. If they are equal, the class is a feature in the engineered page $\delta'$.

Some useful features at radius-two may be lost, but a feature that makes it into $\delta'$ is very likely to be very valuable. FIG. 9, discussed above, indicates that with probability of at least 0.4, links out of IO-bridges go to a single topic. Therefore, a feature in $\delta'$ can be noise only if the topic changed at least twice between $\delta_{before}$ and $\delta_{after}$ is adequately small.

Having defined this new engineered feature set, their quality is evaluated on the set of 849 Yahoo!™ pages described earlier. The classification error rate was only 21%, of the pages that had non-empty feature sets under the above feature engineering rule. Here, again, the number of features used was 14, against the 14,000 of the text-based classifier.

IO-bridges with locality is of higher quality than IO-bridges; however, the latter contains more information and therefore can be used to classify more pages.

7. Summary

In summary, the present invention provides new techniques for automatically classifying hypertext into a given topic hierarchy, using information latent in hyperlinks. There is much information in the hyperlink neighborhood of a document. The iterative relaxation technique bootstraps off a text-based classifier and then uses both local text in a document, as well as the distribution of the estimated classes of other documents in its neighborhood, to refine the class distribution of the document being classified. Using even a small neighborhood around the test document significantly boosts classification accuracy, reducing error up to 62% from text-based classifiers. The present invention also handles the case in which only a fraction of the neighborhood is pre-classified. Even when no document in the neighborhood is pre-classified, the present invention improves on text-based classifiers.

8. Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, the present invention provides a classifier for classifying documents that contain hyperlinks. The present invention also provides a classifier for classifying documents on the Web using any radius of influence.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of classifying a new document containing citations to and from other documents, comprising the steps of:

identifying documents within a multi-radius neighborhood of the new document, wherein the multi-radius neighborhood initially comprises a predetermined number of citations, irrespective of location, to and from the new document;

for each document and each class, determining an initial probability that indicates the probability that the document fits a particular class;

performing iterative relaxation to identify a class for each document using the initial probabilities, wherein contextual and link structures of an entire collection of document text and classes of all multi-radius neighbors are used; and selecting a class into which the new document is to be classified based on the initial probabilities and identified classes, wherein the class of a document determines the text in the document as well as the document's propensity to link to documents from a set of related classes.

2. The method of claim 1, wherein the step of identifying documents further comprises the step of growing a neighborhood around the new document to a selected radius from the new document.

3. The method of claim 1, wherein the step of determining an initial probability further comprises the step of determining a probability vector, wherein each probability vector contains a component corresponding to a class into which a document can be classified.

4. The method of claim 3, wherein the step of selecting a class further comprises the step of selecting the class corresponding to the component of the probability vector having a largest value.

5. The method of claim 1, wherein the step of performing iterative relaxation further comprises the step of using information from a selected radius of influence from the new document.

6. The method of claim 5, wherein the step of performing iterative relaxation further comprises using text from each document.

7. The method of claim 6, wherein the step of using text further comprises the step of using text and classes of documents within the radius of influence to classify the new document.

8. The method of claim 7, wherein the documents within the radius of influence are pre-classified.

9. The method of claim 7, wherein one or more of the documents within the radius of influence are not pre-classified.

10. The method of claim 9, further comprising:
identifying classes for the documents within the radius of influence that are not pre-classified using a text-based classifier;
classifying the new document using the classes of the documents within the radius of influence and the initial probabilities; and
iteratively repeating the steps of identifying and classifying until a stopping criteria is achieved.

11. The method of claim 10, wherein, after each step, a class is assigned to each document within the radius of influence.

12. The method of claim 10, wherein, after each iteration, each document is assigned a probability vector containing estimated probabilities of that document being in a particular class, wherein the probability vector is assigned using the known classes of documents and the initial probabilities.

13. The method of claim 1, wherein the step of performing iterative relaxation further comprises the step of using information from a radius of influence of at least two citations from the new document.

14. The method of claim 13, wherein the step of performing iterative relaxation further comprises using bridges between documents to classify documents.

15. The method of claim 14, further comprising:
for each bridge of the new document,
identifying documents linked to the bridge whose classes are known; and
assigning the new document to one of the known classes based on the number of occurrences of that class.

16. The method of claim 15, wherein the documents linked to the bridge are IO-bridges to the new document, further comprising:
determining class paths for the IO-bridged documents;
augmenting a document using the prefixes of the determined class paths; and
submitting the augmented document to a text-based classifier to determine the class of the new document.

17. The method of claim 14, wherein the bridge is not pure, further comprising the step of segmenting the bridge into segments, each of which is linked to one or more documents of a similar class.

18. An apparatus for classifying a new document containing citations to and from other documents, comprising:
a computer having a data storage device connected thereto; and
one or more computer programs, performed by the computer, for identifying documents within a multi-radius neighborhood of the new document, wherein the multi-radius neighborhood initially comprises a predetermined number of citations, irrespective of location, to and from the new document, for each document and each class, determining an initial probability that indicates the probability that the document fits a particular class, performing iterative relaxation to identify a class for each document using the initial probabilities, wherein contextual and link structures of an entire collection of document text and classes of all multi-radius neighbors are used, and selecting a class into which the new document is to be classified based on the initial probabilities and identified classes, wherein the class of a document determines the text in the document as well as the document's propensity to link to documents from a set of related classes.

19. The apparatus of claim 18, wherein the step of identifying documents further comprises means for growing a neighborhood around the new document to a selected radius from the new document.

20. The apparatus of claim 18, wherein the means for determining an initial probability further comprises the means for determining a probability vector, wherein each probability vector contains a component corresponding to a class into which a document can be classified.

21. The apparatus of claim 20, wherein the means for selecting a class further comprises the means for selecting the class corresponding to the component of the probability vector having a largest value.

22. The apparatus of claim 18, wherein the means for performing iterative relaxation further comprises the means for using information from a selected radius of influence from the new document.

23. The apparatus of claim 22, wherein the means for performing iterative relaxation further comprises using text from each document.

24. The apparatus of claim 23, wherein the means for using text further comprises the means for using text and classes of documents within the radius of influence to classify the new document.

25. The apparatus of claim 24, wherein the documents within the radius of influence are pre-classified.

26. The apparatus of claim 24, wherein one or more of the documents within the radius of influence are not pre-classified.

27. The apparatus of claim 26, further comprising:
means for identifying classes for the documents within the radius of influence that are not pre-classified using a text-based classifier;
means for classifying the new document using the classes of the documents within the radius of influence and the initial probabilities; and
means for iteratively repeating the steps of identifying and classifying until a stopping criteria is achieved.

28. The apparatus of claim 27, wherein, after each step, a class is assigned to each document within the radius of influence.

29. The apparatus of claim 27, wherein, after each iteration, each document is assigned a probability vector containing estimated probabilities of that document being in a particular class, wherein the probability vector is assigned using the known classes of documents and the initial probabilities.

30. The apparatus of claim 22, wherein the means for performing iterative relaxation further comprises the means for using information from a radius of influence of at least two from the new document.

31. The apparatus of claim 30, wherein the means for performing iterative relaxation further comprises using bridges between documents to classify documents.

32. The apparatus of claim 31, further comprising: for each bridge of the new document,
   means for identifying documents linked to the bridge whose classes are known; and
   means for assigning the new document to one of the known classes based on the number of occurrences of that class.

33. The apparatus of claim 31, wherein the documents linked to the bridge are IO-bridges to the new document, further comprising:
   means for determining class paths for the IO-bridged documents;
   means for augmenting a document using the prefixes of the determined class paths; and
   means for submitting the augmented document to a text-based classifier to determine the class of the new document.

34. The apparatus of claim 31, wherein the bridge is not pure, further comprising the means for segmenting the bridge into segments, each of which is linked to one or more documents of a similar class.

35. An article of manufacture comprising a computer program carrier readable by a computer and embodying one or more instructions executable by the computer to perform method steps for classifying a new document containing citations to and from other documents, the method comprising the steps of:
   identifying documents within a multi-radius neighborhood of the new document, wherein the multi-radius neighborhood initially comprises a predetermined number of citations, irrespective of location, to and from the new document;
   for each document and each class, determining an initial probability that indicates the probability that the document fits a particular class;
   performing iterative relaxation to identify a class for each document using the initial probabilities, wherein contextual and link structures of an entire collection of document text and classes of all multi-radius neighbors are used; and
   selecting a class into which the new document is to be classified based on the initial probabilities and identified classes, wherein the class of a document determines the text in the document as well as the document's propensity to link to documents from a set of related classes.

36. The method of claim 35, wherein the step of identifying documents further comprises the step of growing a neighborhood around the new document to a selected radius from the new document.

37. The method of claim 35, wherein the step of determining an initial probability further comprises the step of determining a probability vector, wherein each probability vector contains a component corresponding to a class into which a document can be classified.

38. The method of claim 37, wherein the step of selecting a class further comprises the step of selecting the class corresponding to the component of the probability vector having a largest value.

39. The method of claim 35, wherein the step of performing iterative relaxation further comprises the step of using information from a selected radius of influence from the new document.

40. The method of claim 38, wherein the step of performing iterative relaxation further comprises using text from each document.

41. The method of claim 40, wherein the step of using text further comprises the step of using text and classes of documents within the radius of influence to classify the new document.

42. The method of claim 41, wherein the documents within the radius of influence are pre-classified.

43. The method of claim 41, wherein one or more of the documents within the radius of influence are not pre-classified.

44. The method of claim 43, further comprising:
   identifying classes for the documents within the radius of influence that are not pre-classified using a text-based classifier;
   classifying the new document using the classes of the documents within the radius of influence and the initial probabilities; and
   iteratively repeating the steps of identifying and classifying until a stopping criteria is achieved.

45. The method of claim 44, wherein, after each step, a class is assigned to each document within the radius of influence.

46. The method of claim 44, wherein, after each iteration, each document is assigned a probability vector containing estimated probabilities of that document being in a particular class, wherein the probability vector is assigned using the known classes of documents and the initial probabilities.

47. The method of claim 39, wherein the step of performing iterative relaxation further comprises the step of using information from a radius of influence of at least two from the new document.

48. The method of claim 47, wherein the step of performing iterative relaxation further comprises using bridges between documents to classify documents.

49. The method of claim 48, further comprising:
   for each bridge of the new document,
      identifying documents linked to the bridge whose classes are known; and
      assigning the new document to one of the known classes based on the number of occurrences of that class.

50. The method of claim 49, wherein the documents linked to the bridge are IO-bridges to the new document, further comprising:
   determining class paths for the IO-bridged documents;
   augmenting a document using the prefixes of the determined class paths; and
   submitting the augmented document to a text-based classifier to determine the class of the new document.

51. The method of claim 48, wherein the bridge is not pure, further comprising the step of segmenting the bridge into segments, each of which is linked to one or more documents of a similar class.

* * * * *